US010817263B2

(12) United States Patent
Kumar et al.

(10) Patent No.: US 10,817,263 B2
(45) Date of Patent: Oct. 27, 2020

(54) WORKFLOW DEVELOPMENT SYSTEM WITH EASE-OF-USE FEATURES

(71) Applicant: Microsoft Technology Licensing, LLC, Redmond, WA (US)

(72) Inventors: Prashant Kumar, Bellevue, WA (US); Jonjo Twist, Redmond, WA (US); Stephen C. Siciliano, Bellevue, WA (US); Himanshu Agrawal, Bellevue, WA (US); Prabir K. Shrestha, Redmond, WA (US); Balasubramanian Shyamsundar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/524,779

(22) Filed: Jul. 29, 2019

(65) Prior Publication Data
US 2019/0354350 A1 Nov. 21, 2019

Related U.S. Application Data

(63) Continuation of application No. 15/232,575, filed on Aug. 9, 2016, now Pat. No. 10,409,558.
(Continued)

(51) Int. Cl.
*G06Q 10/06* (2012.01)
*G06Q 10/00* (2012.01)
(Continued)

(52) U.S. Cl.
CPC ............... *G06F 8/22* (2013.01); *G06F 8/10* (2013.01); *G06F 8/34* (2013.01); *G06F 8/36* (2013.01);
(Continued)

(58) Field of Classification Search
CPC .... G06Q 10/0633; G06Q 10/06; G06Q 10/10; G06Q 10/103; G06F 8/20; G06F 8/30;
(Continued)

(56) References Cited

U.S. PATENT DOCUMENTS 8,332,811 B2    12/2012 Festa
8,751,284 B2    6/2014 Goja
(Continued)

OTHER PUBLICATIONS

Avellino et al., A semantic workflow authoring tool for programming grids, 6 pages (Year: 2007).*
(Continued)

*Primary Examiner* — Thuy Dao
(74) *Attorney, Agent, or Firm* — Fiala & Weaver P.L.L.C.

(57) ABSTRACT

A workflow development system is described herein that includes a graphical user interface (GUI) that is configured to selectively and dynamically allocate relatively more of a display area to a particular one of a plurality of different, simultaneously-displayed workflow step representations than is allocated to the other workflow step representation(s) to facilitate user interaction the particular workflow step representation. Such allocation may be carried out in response to user interaction with the particular workflow step representation or in response to a determination that a user is otherwise focused on the particular workflow step representation. In embodiments, the workflow step representations represent different workflow steps in a series of workflow steps. In further embodiments, the workflow step representations represent different workflow steps that may be performed depending upon the evaluation of a condition.

20 Claims, 18 Drawing Sheets

Related U.S. Application Data

(60) Provisional application No. 62/258,851, filed on Nov. 23, 2015.

(51) Int. Cl.
| | | |
|---|---|---|
| *G06F 9/44* | (2018.01) | |
| *G06F 17/00* | (2019.01) | |
| *G06F 8/20* | (2018.01) | |
| *G06F 8/34* | (2018.01) | |
| *G06F 8/10* | (2018.01) | |
| *G06F 8/36* | (2018.01) | |

(52) U.S. Cl.
CPC .......... *G06Q 10/06* (2013.01); *G06Q 10/0633* (2013.01)

(58) Field of Classification Search
CPC ........ G06F 8/36; G06F 9/451; G06F 9/45529; G06F 8/34; G06F 8/38
See application file for complete search history.

(56) References Cited

U.S. PATENT DOCUMENTS

| | | | |
|---|---|---|---|
| 8,862,975 B2* | 10/2014 | Liao | G06F 3/048 |
| | | | 715/200 |
| 9,342,272 B2* | 5/2016 | Tattrie | G06F 8/20 |
| 9,898,462 B2 | 2/2018 | Cope | |
| 2014/0032606 A1* | 1/2014 | Chandler | G06F 8/34 |
| | | | 707/798 |
| 2014/0236663 A1 | 8/2014 | Smith et al. | |
| 2015/0160809 A1* | 6/2015 | Mikheev | G06F 3/0484 |
| | | | 715/763 |
| 2017/0315782 A1 | 11/2017 | Chaudhry et al. | |
| 2020/0097258 A1 | 3/2020 | Kumar et al. | |

OTHER PUBLICATIONS

"Notice of Allowance Issued in U.S. Appl. No. 15/188,407", dated Aug. 26, 2019, 6 Pages.

* cited by examiner

WORKFLOW DEVELOPMENT SYSTEM WITH EASE-OF-USE FEATURES

CROSS-REFERENCE TO RELATED APPLICATIONS

This application is a continuation of U.S. patent application Ser. No. 15/232,575, filed on Aug. 9, 2016, which claims the benefit of U.S. Provisional Patent Application No. 62/258,851, filed on Nov. 23, 2015. The entirety of each of these applications is incorporated by reference herein.

BACKGROUND

A business or enterprise application is a computer program used by business users to perform various business functions. Business applications are frequently developed when available off-the-shelf software does not completely address the desired functionality. Many business applications are interactive, having a graphical user interface (GUI) via which users can input data, submit data queries, perform operations, and view results. Consumer applications are less business focused, instead being focused on the needs of the consumer.

Business and consumer users tend to depend on information technology (IT) personnel to code their applications due to application complexity, and the programming expertise required. For example, merely designing an application to retrieve data from a remote source (e.g., a cloud service) is difficult, typically requiring the involvement of an experienced software developer.

Developing business and consumer applications is an activity that is typically performed on desktop computer systems having relatively large displays and a standard keyboard and mouse for accepting user input. Consequently, many tools for developing business and consumer applications do not include GUIs that are designed to efficiently use whatever screen space is available for displaying the GUI. Likewise, many tools for developing business and consumer applications do not include GUIs that take advantage of touch-based user input schemes or other techniques for reducing the amount of user interaction and user input required to develop such applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses and computer program products are described herein that provide a GUI for a workflow development system. The GUI is configured to selectively and dynamically allocate relatively more of a display area to a particular one of a plurality of different, simultaneously-displayed workflow step representations than is allocated to the other workflow step representation(s) to facilitate user interaction the particular workflow step representation. Such allocation may be carried out in response to user interaction with the particular workflow step representation or in response to a determination that a user is otherwise focused on the particular workflow step representation. In embodiments, the workflow step representations represent different workflow steps in a series of workflow steps. In further embodiments, the workflow step representations represent different workflow steps that may be performed depending upon the evaluation of a condition.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
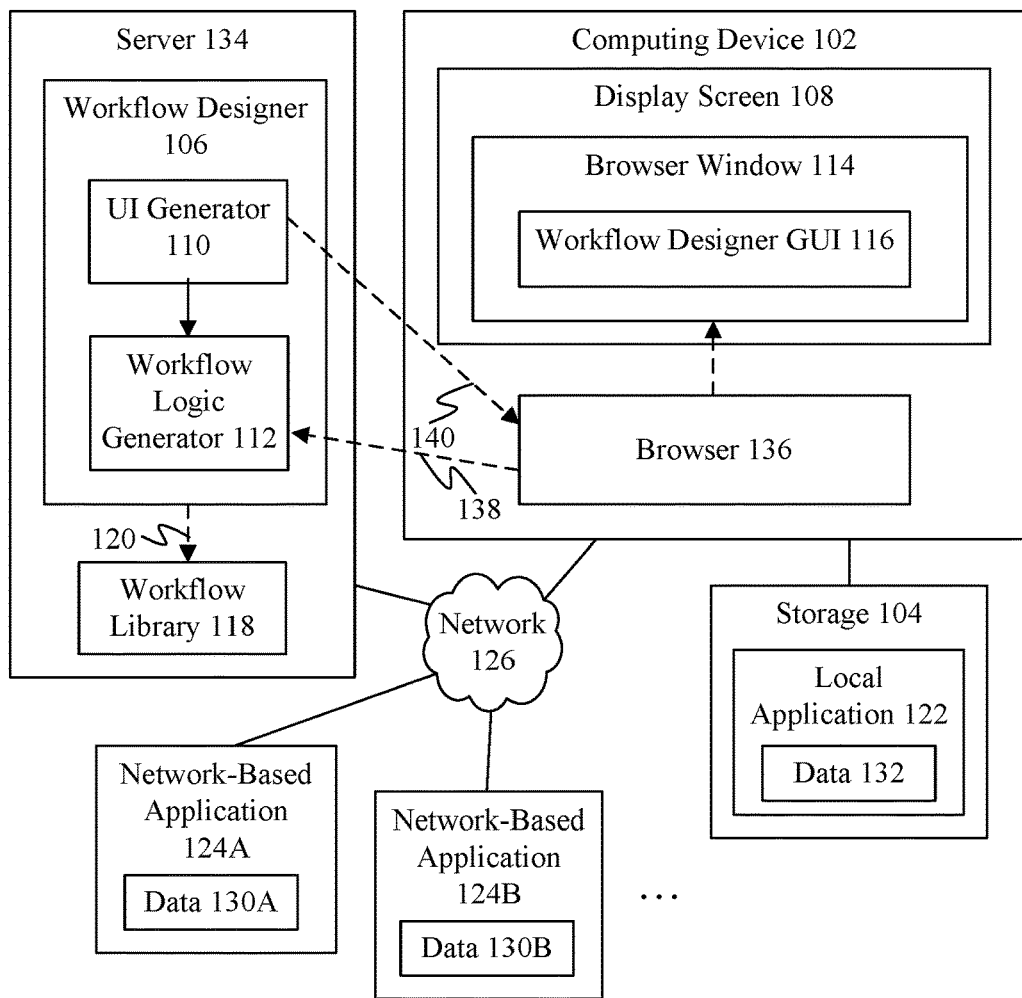
FIG. 1 is a block diagram of a workflow development system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below will describe example embodiments for development of workflows. Sub-sections A and B of Section II describe example workflow development embodiments and runtime embodiments, respectively. Sub-section C describes ease of use features that can be implemented in a workflow development system. In particular, sub-section C of Section II describes example embodiments for selectively and dynamically allocating varying amounts of a fixed display area to workflow step representations being displayed within a workflow designer GUI, wherein a workflow step representation a user is interested in or would like to work with is granted more display area than other workflow step representation(s). Such ease of use features are useful on any platform, but may be particularly useful in mobile device embodiments where screen space is limited.

Section III below will describe an example mobile device that may be used to implement features of the embodiments described herein. Section IV below will describe an example processor-based computer system that may be used to implement features of the embodiments described herein. Section V below will describe some additional example embodiments. Section VI will provide some concluding remarks.

II. Example Embodiments for Development of Workflows

Business applications and consumer applications are typically created when available off-the-shelf software does not completely address the desired functionality. Many business and consumer applications are interactive, having a GUI via which users can input data, submit data queries, perform operations, and view results.

Users tend to depend on IT personnel to code their applications due to application complexity and the programming expertise required. For instance, configuring an application to retrieve data from a source of interest to enterprises or consumers (e.g., data from an SQL (structured query language) database, customer relationship information from Salesforce.com of San Francisco, Calif., social network information from Facebook® operated by Facebook, Inc. of Palo Alto, Calif., or Twitter® operated by Twitter, Inc. of San Francisco, Calif.) is a difficult process.

Embodiments described herein enable easier development of applications, including business applications and consumer applications. Users are enabled to develop applications in the form of workflows without having to be expert programmers.

Example embodiments are described in the following subsections for development of applications in the form of workflows. In the following description, a person that develops an application using the techniques described herein is referred to as a "developer," to be distinguished from a person that uses the application at runtime (a "user" or "end user"). It is noted, however, that a "developer," as referred to herein, does not need to have any expertise in computer programming Various embodiments described herein enable application development without special programming skills.

A. Example Workflow Development Embodiments

Development of workflows may be enabled in various ways in embodiments. For instance, FIG. 1 is a block diagram of a workflow development system 100, according to an example embodiment. As shown in FIG. 1, system 100 includes a computing device 102, storage 104, a first network-based application 124A, a second network-based application 124B, and a server 134. Server 134 includes a workflow designer 106 and a workflow library 118 (e.g., in storage). Computing device 102 includes a display screen 108 and a browser 136. Storage 104 stores a local application 122. System 100 is described as follows.

Computing device 102 may be any type computing device, including a mobile computing device (e.g., a smart phone, a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer). Server 134 may include one or more server devices and/or other computing devices.

Local application 122 in storage 104 is an example of an application accessible by computing device 102 without communicating over a network. Local application 122 may be configured to perform data processing and/or data hosting operations when executed by a processor of computing device 102, and may provide data 132 to workflows developed using workflow designer 106 when such workflows are executed at runtime. Local application 122 may be any type of local application or service, such as a database application (e.g., QuickBooks®, a Microsoft® Excel® spreadsheet), an e-mail application (e.g., Microsoft® Outlook®), a productivity application (e.g., Microsoft® Word®, Microsoft® PowerPoint®, etc.), or another type of application. Although FIG. 1 shows a single local application, any number of local applications may be present at computing device 102, including numbers in the tens, hundreds, or greater numbers.

First and second network-based applications 124A and 124B are examples of network-based applications, which in some instances may be referred to as "cloud" applications or services. Network-based applications 124A and 124B are accessible by computing device 102 over network 126, may be configured to perform data processing and/or data hosting operations, and may provide data 130A and 130B, respectively, to workflows created using workflow designer 106 when such workflows are executed at runtime. Network-based applications 124A and 124B may each be any type of network-accessible applications or services, such as database applications, social networking applications, messaging applications, financial services applications, news applications, search applications, productivity applications, cloud storage applications, file hosting applications, etc. Examples of such applications include a network-accessible SQL (structured query language) database, Salesforce.com™, Facebook®, Twitter®, Instagram®, Yammer®, LinkedIn®, Yahoo!® Finance, The New York Times® (at www.nytimes.com), Google search, Microsoft® Bing, Google Docs™, Microsoft® Office 365, Dropbox™, etc. Although FIG. 1 shows two network-based applications, any number of network-based applications may be accessible over network 126, including numbers in the tens, hundreds, thousands, or greater numbers.

Note that data 130A, data 130B, and data 132 may each include any type of data, including messages, notifications, calculated data, retrieved data, structured data, unstructured data, and/or any other type of information requested or usable by a workflow.

Computing device 102 and server 134 may each include at least one wired or wireless network interface that enables communications with each other and with network-based applications 124A and 124B over network 126. Examples of such a network interface include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 126 include a local area network (LAN), a wide area network (WAN) such as the Internet, a personal area network (PAN), and/or a combination of communication networks.

Workflow designer 106 is configured to be operated/interacted with to create applications in the form of workflows. For instance, a developer may access workflow designer 106 by interacting with an application at computing device 102 that is capable of accessing a network-based application, such as browser 136. The developer may use browser 136 to traverse a network address (e.g., a uniform resource locator) to workflow designer 106, which invokes a workflow designer GUI 116 (e.g., a web page) in a browser window 114. The developer is enabled to interact with workflow designer GUI 116 to develop a workflow.

As shown in FIG. 1, workflow designer 106 includes a UI generator 110 and a workflow logic generator 112. UI generator 110 is configured to transmit workflow GUI information 140 (e.g., one or more web pages, image content, etc.) to browser 136 to be displayed as workflow designer GUI 116 within browser window 114 in display screen 108. Workflow designer GUI 116 may be interacted with by a developer to select and configure workflow steps into a workflow. For example, the developer may insert and sequence a plurality of workflow steps in workflow designer GUI 116, with one or more of the steps being associated with a local or network-based application. Browser 136 stores the selected workflow steps, corresponding configuration information, and workflow step sequence information as constructed workflow information 138. Constructed workflow information 138 is transmitted to workflow logic generator 112 at server 134. Workflow logic generator 112 generates workflow logic 120 based on the assembled workflow represented by constructed workflow information 138. The workflow represented by workflow logic 120 may subsequently be invoked for execution by an end user.

During runtime execution of the workflow, workflow logic 120 may invoke operation of one or more local or network-based applications associated with the workflow steps of workflow logic 120. Each workflow step may receive input data. Such input data may include, for example, data 132 from local application 122, data 130A from network-based application 124A, data 130B from network-based application 124B, data from another application, and/or data from another workflow step of workflow logic 120.

Figure 2:
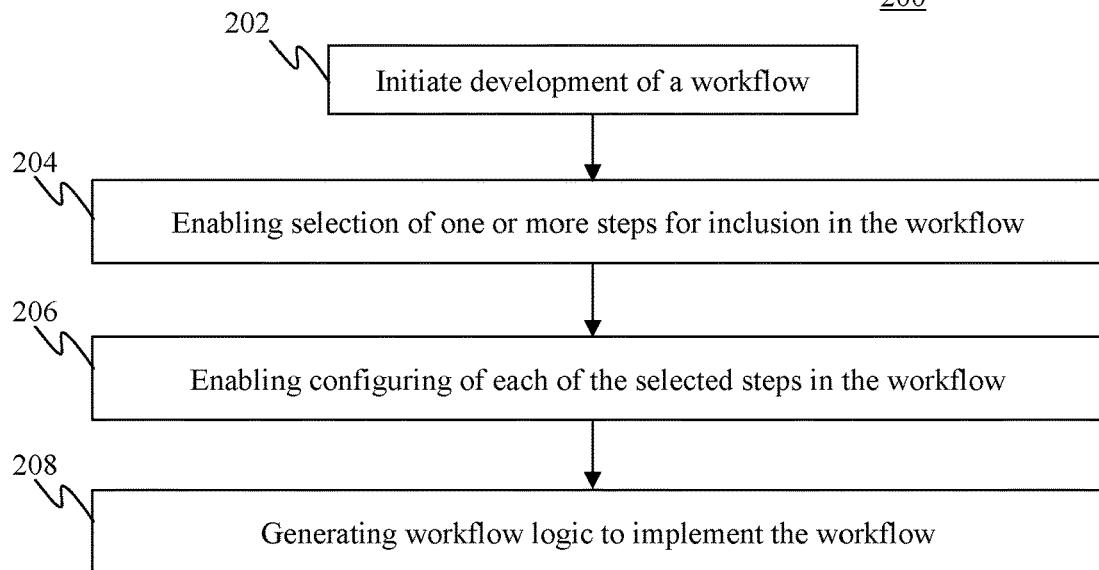
FIG. 2 depicts a flowchart of a process for development of workflows, according to an example embodiment.
Figure 3:
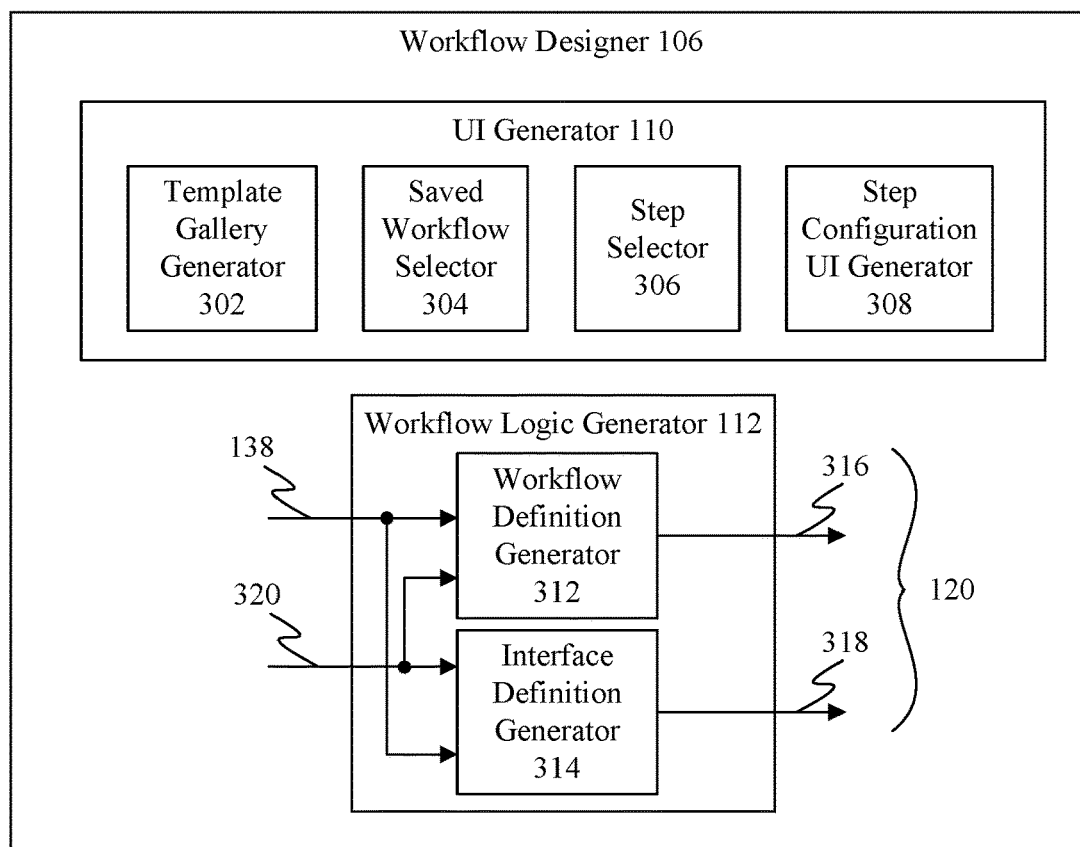
FIG. 3 is a block diagram of a workflow designer application, according to an example embodiment.
Figure 4:
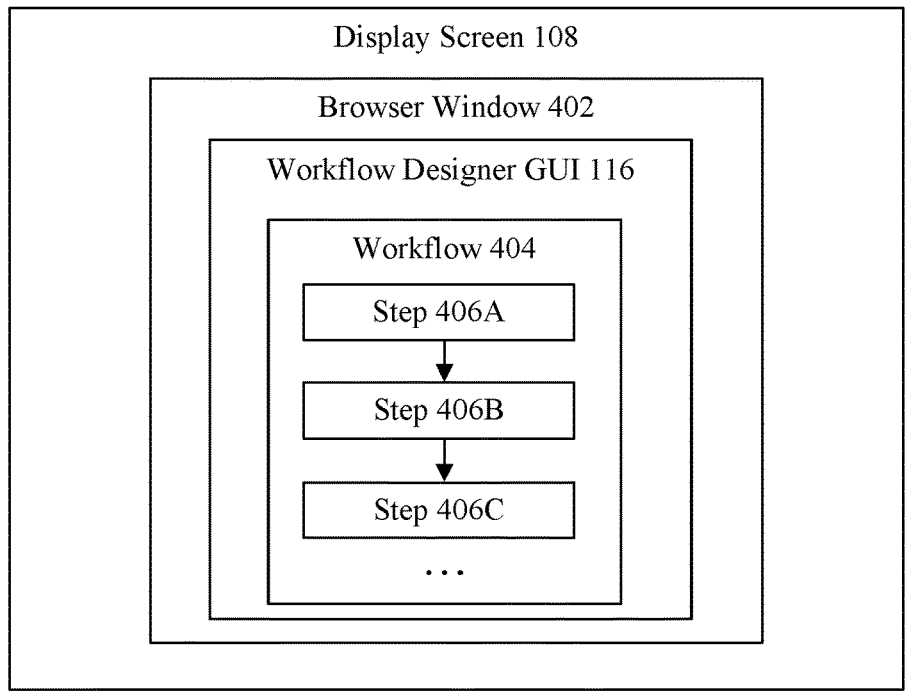
FIG. 4 is a block diagram of a display screen showing a browser window displaying an exemplary workflow, according to an example embodiment.

Workflow designer 106 may operate in various ways, to enable development of a workflow. For instance, in embodiments, workflow designer 106 may operate in accordance with flowchart 200 of FIG. 2. In particular, flowchart 200 depicts a process for development of workflows, according to an example embodiment. Flowchart 200 and workflow designer 106 are described as follows with respect to FIGS. 3 and 4. FIG. 3 is a block diagram of workflow designer 106, according to an example embodiment. As shown in FIG. 3, workflow designer 106 includes UI generator 110 and workflow logic generator 112. UI generator 110 includes a template gallery generator 302, a saved workflow selector 304, a step selector 306, and a step configuration UI generator 308. Workflow logic generator 112 includes a workflow definition generator 312 and an interface definition generator 314. FIG. 4 is a block diagram of display screen 108, illustrating an example of workflow designer GUI 116 displayed in browser window 402 on display screen 108, according to an example embodiment Flowchart 200 of FIG. 2 begins with step 202. In step 202, development of a workflow is initiated. For example, in an embodiment, workflow designer 106 may be invoked by a developer interacting with browser 136 at computing device 102. The developer may traverse a link or other network address directed to workflow designer 106 at server 134, to invoke workflow designer 106, causing workflow designer 106 to provide workflow GUI information 140 (e.g., one or more web pages, image content, etc.) to browser 136 to be displayed as workflow designer GUI 116 in display screen 108 in browser window 114. Once invoked, the developer may open an existing workflow for further development, or may begin developing a new workflow.

In one example, a displayed page of workflow designer GUI 116 may display a template gallery generated by template gallery generator 302. The template gallery may include a plurality of selectable workflow templates, each of which includes one or more pre-selected workflow steps that are suitable for further configuration by a developer. The workflow templates may be stored in workflow library 118, and accessed for display by workflow designer GUI 116. The developer may select one of the workflow templates for inclusion in their workflow, and may proceed with configuring the contents of the workflow template, and/or may add additional workflow steps to the workflow steps of the workflow template to generate a more complex workflow.

For instance, in the example of FIG. 4, steps 406A and 406B may have been included in a workflow template placed in workflow 404, and step 406C may have been subsequently added (e.g., via selection from a menu or other list of workflow steps).

In another example, saved workflow selector 304 may enable the developer to select an existing, saved workflow to be opened for further editing in a displayed page of workflow designer GUI 116. The saved workflows may be stored in workflow library 118 or elsewhere. For example, saved workflow selector 306 may display a list of saved workflows, may enable navigation to a saved workflow, and/or may provide another mechanism for selecting a saved workflow for editing. The developer may then proceed with further configuring the contents of the workflow, adding workflow steps, modifying workflow steps, removing workflow steps, or the like.

In yet another example, a displayed page of workflow designer GUI 116 may provide a blank window, area or canvas to which one or more developer-selected workflow steps may be added, ordered and configured. Such blank window, area or canvas may be generated by UI generator 110 automatically or in response to some developer input or interaction.

In step 204, selection of one or more steps for inclusion in the workflow is enabled. When a developer is editing a workflow, step selector 306 may enable the developer to select workflow steps for inclusion in the workflow, and to order the steps. The workflow steps may be accessed by step selector 306 in workflow library 118. For instance, step selector 306 may display a menu of workflow steps, a scrollable and/or searchable list of available workflow steps, or may provide the workflow steps in another manner, and may enable the developer to select any number of workflow steps from the list for inclusion in the workflow.

In one example, step selector 306 may enable a developer to select a step that is associated with a local application, such as Microsoft® Outlook®, or a network-based application, such as Facebook®. Step selector 306 enables the steps to be chained together in a sequence, optionally with conditional steps, for inclusion in workflow logic 120.

In step 206, each of the selected steps in the workflow is enabled to be configured. In an embodiment, step configuration UI generator 308 enables configuration of each workflow step in a workflow. Step configuration UI generator 308 accesses each selected workflow step in workflow library 118 to determine the configuration of the workflow step, including all of its input parameters and any other selections or information that a developer needs to provide to the workflow step to configure it. For example, step configuration UI generator 308 may generate a UI that enables the developer to type, navigate to, use a pull-down menu, or otherwise enter input data into a text input box or other data entry element to configure (e.g., specify an input parameter of) a workflow step. The developer may configure an output parameter of a prior step to be input data for a workflow step. Step configuration UI generator 208 may enable data or other objects to be copied and pasted, dragged and dropped, or otherwise entered from elsewhere into data entry elements of a workflow step.

In step 208, workflow logic to implement the workflow is generated. In an embodiment, workflow logic generator 112 is configured to package and generate workflow logic 120 based on constructed workflow information 138 when the developer indicates the workflow is finished, such as when the developer interacts with workflow designer GUI 116 to save the workflow. As shown in FIG. 3, workflow logic generator 112 receives constructed workflow information 138. Constructed workflow information 138 indicates which workflow steps have been inserted into the workflow, their input parameter values, and their sequencing. Workflow logic generator 112 also receives selected workflow logic 320, which is the workflow logic for each workflow step of the workflow as indicated in constructed workflow information 138. In one example, workflow logic generator 112 retrieves workflow logic from workflow library 118 for each workflow step indicated in constructed workflow information 138, to receive selected workflow logic 320. Workflow logic generator 112 generates workflow logic 120 for the workflow based on constructed workflow information 138 and selected workflow logic 320. For example, workflow logic generator 112 may generate workflow logic 120 in the form of an executable file, a zip file, or other form, which may be executed in a standalone fashion, may be executed in a browser, or may be executed in another manner, depending on the particular type of workflow being generated.

With reference to FIG. 3, workflow logic generator 112 may generate workflow logic 120 to include at least two components (e.g., files): workflow definition information 316 and interface definition information 318. Workflow definition information 316 includes information that defines the sequence and operation of the workflow of workflow logic (e.g., lists the workflow step operations and their ordering/sequencing) and includes the parameter values for the workflow. For example, workflow definition information 316 may be generated to contain information in the format of a JSON (JavaScript object notation) file or in another form. Interface definition information 318 includes information that defines the interfaces/parameters (e.g., inputs and outputs) of the workflow steps of the workflow. For example, interface definition information 318 may be generated to contain information in the format of a Swagger (a specification for REST (representational state transfer) web services) file or in another form. For instance, each workflow step may be represented in workflow library 118 as API (application programming interface) metadata in Swagger format, defining what are the inputs and outputs (parameters) of the workflow step, such that a service may be accessed according to the API definition. In such an implementation, the operations in the workflow definition information 316 refer to the corresponding API metadata in the interface definition information 318 to provide a complete structure of a generated workflow (e.g., each sequenced workflow step/operation defined with parameter values in the workflow definition information 316 has a corresponding API, which is defined in the interface definition information 318).

Accordingly, flowchart 200 and workflow designer 106 enable a developer to create workflows. FIGS. 5-8 show views of an exemplary workflow in various phases of development using a workflow designer GUI, according to example embodiments. For example, each of FIGS. 5-8 shows browser window 402 displaying a corresponding view of workflow designer GUI 116 being used to develop a workflow.

Figure 5:
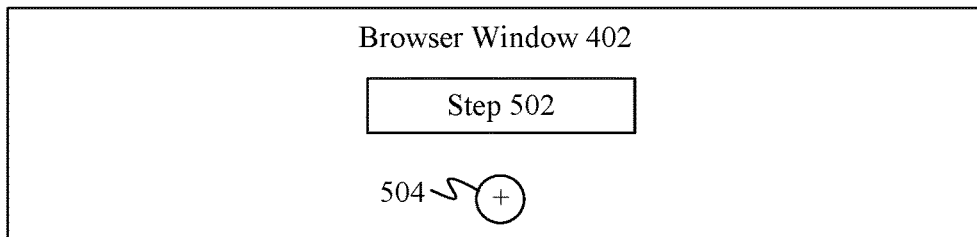
FIGS. 5-8 show views of an exemplary workflow in various phases of development using a workflow designer GUI, according to example embodiments.

For instance, FIG. 5 shows browser window 402 including a workflow step 502 and an add interface 504. Workflow step 502 was selected by a developer to be a first step in a workflow. Add interface 504 (e.g., a button or other GUI control) may be interacted with by the developer to add further workflow steps to the workflow.

As described above, a developer is enabled to select workflow step 502 from a list or library of steps, a template gallery, or elsewhere. A list, library, or gallery may include any number of workflow steps. The workflow steps may be associated with network-based applications mentioned elsewhere herein or otherwise known (e.g., Dropbox™), and/or with local applications mentioned elsewhere herein or otherwise known (e.g., Microsoft® Outlook®). Each workflow step is configured to be plugged into the workflow. Each workflow step is configured with the appropriate logic and/or interface(s) to perform its respective function(s), which may include communicating with a local or remote application. For instance, a workflow step for transmitting a query to an application (e.g., a search query to a search engine, a database query to a database, a request for data from a social networking application, etc.) may be pre-configured in terms of how to properly transmit and format such a request to the application. As another example, a workflow step for receiving a response to a request may be pre-configured in terms of how to parse the response for desired response data. As such, a developer of a workflow does not need to know how to write program code in a programming language, to interface with complex application interfaces (e.g., application programming interfaces (APIs)), or to understand network communication protocols, as the workflow steps are already set up. When a workflow step is plugged into workflow logic by a developer, the developer configures the inputs to the workflow step (as described below), and the pre-configured workflow step handles any communications with other applications.

Figure 6:
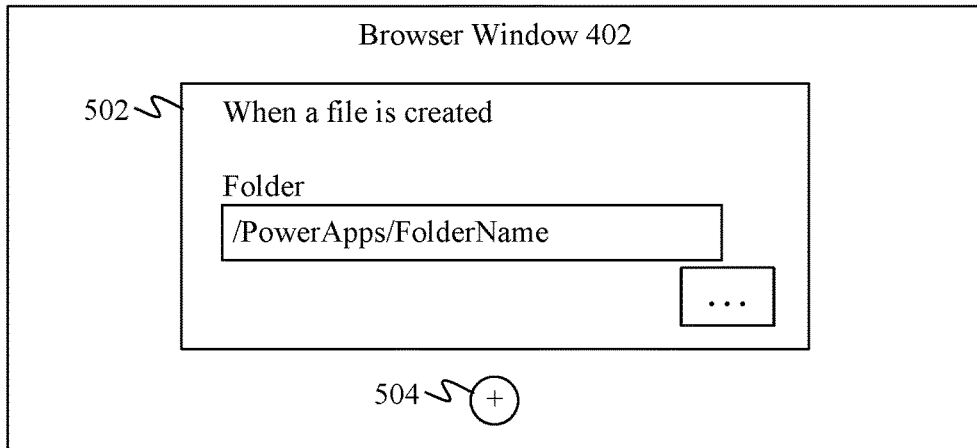

In FIG. 6, the developer has interacted with step 502 (e.g., by mouse click, etc.) to cause step configuration UI generator 310 to generate a UI for configuration of step 502. For instance, in the example of FIG. 6, workflow step 502 is configured to perform monitoring to determine if a file has been created in a particular folder identified by the developer in a text input box (e.g., by typing, clicking on a navigator indicated by ". . . ", etc.). When workflow step 502 determines that a file has been added to the indicated folder, a workflow step following workflow step 502 is triggered. Thus, workflow step 502 may be considered a trigger step in this example.

Figure 7:
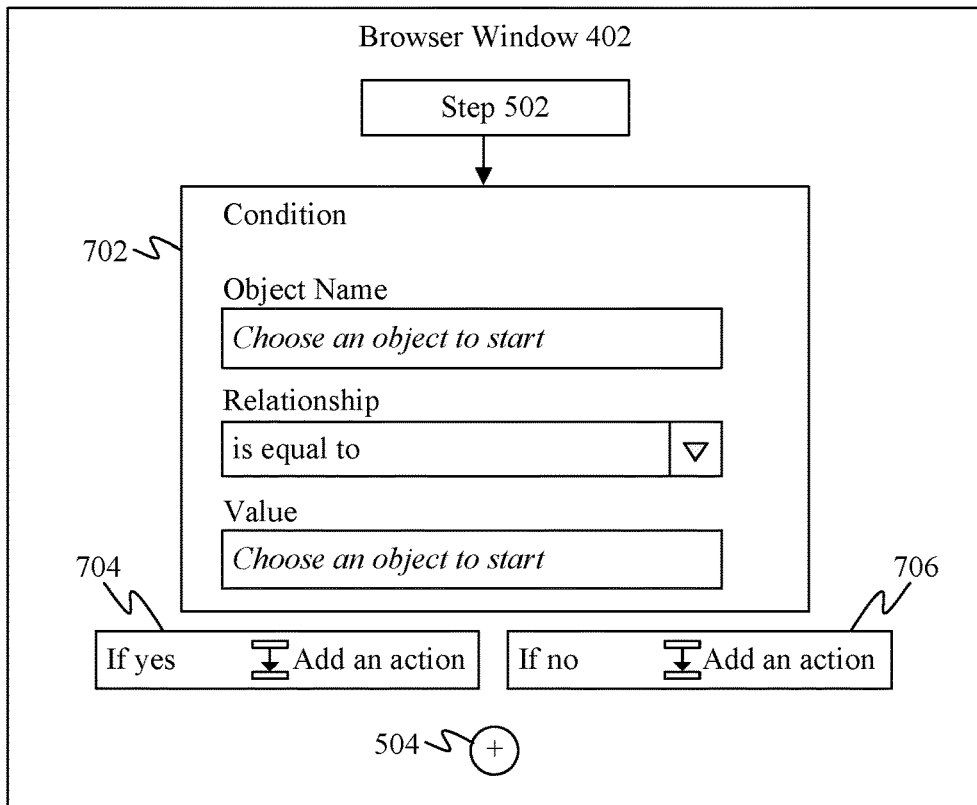

For instance, in FIG. 7, the developer interacted with add interface 504 to facilitate the selection of a next workflow step 702. For instance, in an embodiment, interaction with add interface 502 invokes step selector 306 in FIG. 3, which enables the developer to select a workflow step. In the example of FIG. 7, workflow step 702 is a conditional step. In embodiments, logical elements may be selected for inclusion in a workflow, including arithmetic logic (e.g., summers, multipliers, etc.), conditional logic, etc., that operate based on variable values determined in earlier workflow steps. The condition of workflow step 702 enables the workflow to fork based on the determination of a condition (e.g., a variable value). The condition may include an object name, a relationship (e.g., a logical relationship, such as equal to, includes, not equal to, less than, greater than, etc.), and a value, which are all defined by the developer interacting with workflow step 702. Corresponding action steps may be performed depending on which way the workflow forks based on the condition.

For instance, in one illustrative example of FIG. 7, the object name may be selected (e.g., from a list of possibilities) to be a name of the created file of workflow step 502, the relationship may be "contains" (e.g., selected by a pull-down menu) and the value may be "dummyfile" (e.g., typed in by the developer). The condition evaluates to a "yes" condition if the file name contains "dummyfile," which invokes first action workflow step 704, and evaluates to "no" condition if the file name does not contain "dummyfile," which invokes second action workflow step 706. An action may be defined for one or both of the "yes" and "no" action workflow steps 704 and 706 by the developer, if desired.

Figure 8:
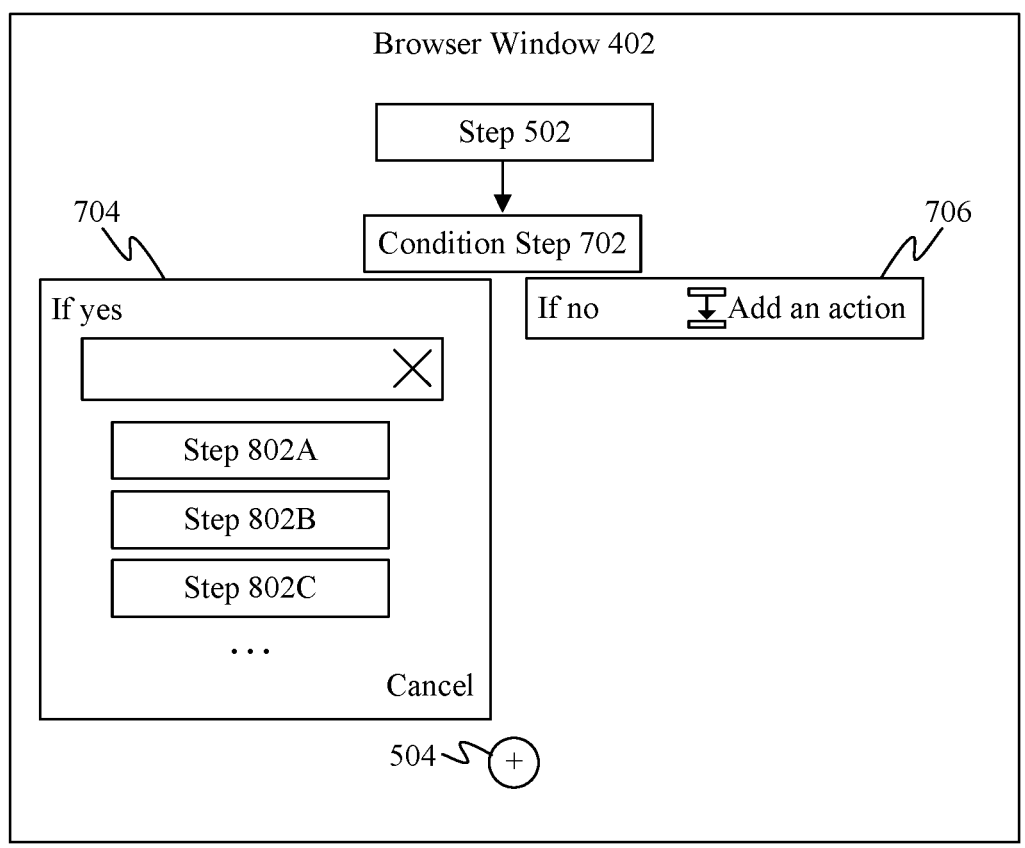

For example, in FIG. 8, the developer interacts with action workflow step 704 to define an action. In this example, the developer is defining action workflow step 704 by selecting a workflow step via step selector 306. As shown in FIG. 8, a list of workflow steps 802A, 802B, 802C is displayed, from which the developer can select a workflow step (e.g., by mouse click, etc.) to be performed for action workflow step 704. The workflow step can be a trigger step, an action step, or a condition step. After selecting the workflow step, the developer may configure the workflow step as described above. Furthermore, the developer may configure an action for workflow step 706, may add further workflow steps, etc., eventually being enabled to save the workflow.

It is noted that in some embodiments, a workflow step, such as first workflow step 502, may require credentials (e.g., a login and password) to access indicated data (e.g., to access a file at the location indicated in the text input box in FIG. 6). As such, the developer may be requested to provide credential information in association with first workflow step 502 so that when first workflow step 502 is performed during runtime, the data may be accessed. Alternatively, the credentials may be requested of a user during runtime.

B. Example Runtime Embodiments

According to embodiments, end users may execute workflows developed as described herein. During operation, an end user may interact with a GUI of the workflow, which may lead to workflow logic being executed. The workflow logic may execute locally (e.g., in a browser) and/or at a remote service (in "the cloud"). The workflow logic may access data of one or more local or network-accessible applications as was configured by the developer. Accordingly, the workflow performs its intended functions.

Figure 9:
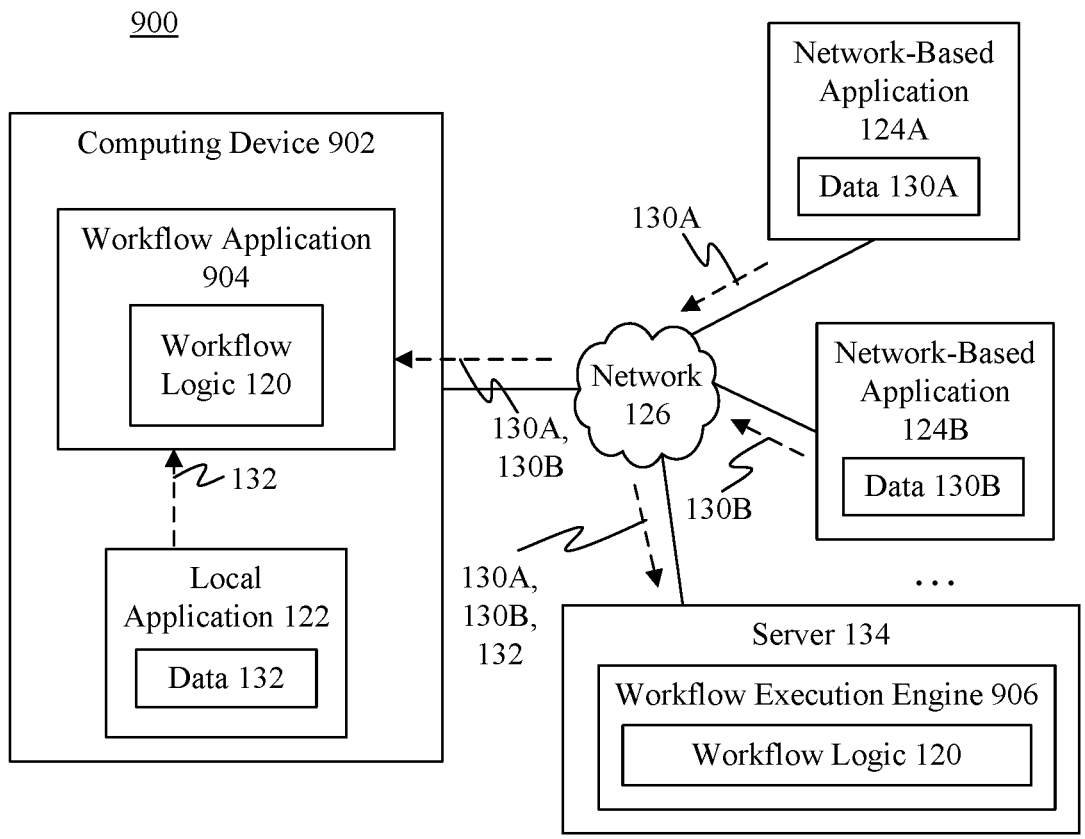
FIG. 9 is a block diagram of a system for executing a workflow, according to an example embodiment.

FIG. 9 is a block diagram of a system 900 for executing a workflow that includes one or more workflow steps, according to an example embodiment. As shown in FIG. 9, system 900 includes a computing device 902, first network-based application 124A, second network-based application 124B, and server 134. Computing device 902 includes a workflow application 904. Server 134 includes a workflow execution engine 906. System 900 is described as follows.

First and second network-based applications 124A and 124B are each optionally present, and whether or not such applications are communicated with will depend on the configuration of workflow logic 120. Further network-based applications may be present and communicated with, depending on the configuration of workflow logic 120.

Computing device 902 may be any type of stationary or mobile computing device described herein or otherwise known. Computing device 902 is configured to communicate with first and second network-based applications 124A and 124B and server 134 over network 126.

In one embodiment, workflows are executed at server 134 by workflow execution engine 906, and workflow application 904 is a UI application that enables a user at computing device 902 to interact with the executing workflows, such as by selecting and invoking the workflows, receiving communications from the executing workflows (e.g., messages, alerts, output data, etc.), providing requested input data to executing workflows, etc. In such an embodiment, workflow application 904 may be a workflow UI application associated with workflow execution engine 906 (e.g., workflow application 904 may be an extension of workflow execution engine 906) that may operate separate from or within a browser at computing device 902, or may be configured in another way. As shown in FIG. 9, workflow execution engine 906 may load workflow logic 120 for a selected workflow (e.g., selected from a workflow library by a user), and may execute workflow logic 120 to execute the workflow.

In another embodiment, workflow application 904 may be configured to execute workflows at computing device 902. For instance, an end user of computing device 902 may interact with a user interface of workflow application 904 to select and invoke a particular workflow (e.g., selected from a workflow library). In such embodiments, workflow logic 120 may operate separate from or in a browser at computing device 902, or may be configured in another way. As shown in FIG. 9, workflow application 904 may load workflow logic 120 for a selected workflow (e.g., selected from a workflow library by a user), and may execute workflow logic 120 to execute the workflow.

In another embodiment, a first portion of workflow logic 120 may execute in workflow application 904 at computing device 902 and a second portion of workflow logic 120 may execute in workflow execution engine 906 at server 134 and/or elsewhere.

Figure 10:
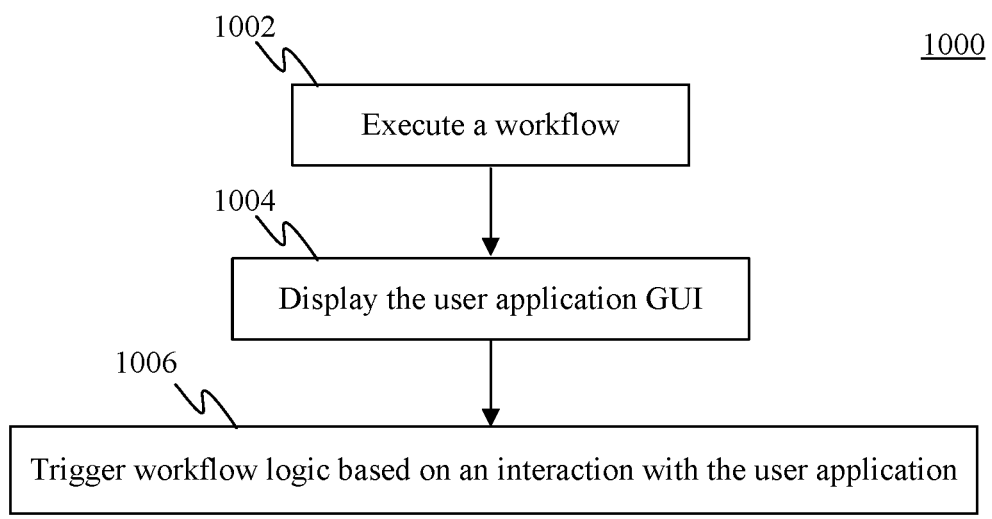
FIG. 10 depicts a flowchart of a process for executing a user application that includes one or more workflows, according to an example embodiment.

FIG. 10 depicts a flowchart 1000 of a process for executing workflow logic 120 of a workflow, according to an example embodiment. Flowchart 1000 is described as follows with respect to system 900 of FIG. 9 for illustrative purposes.

Flowchart 1000 begins with step 1002. In step 1002, the workflow is executed. In an embodiment, an end user at computing device 902 may cause workflow logic 120 to be executed, such as by command line, by clicking/tapping or otherwise interacting with an icon representing the application, by selection in a browser, or in another manner. As described above, workflow logic 120 may execute in workflow application 904 at computing device 902 and/or in workflow execution engine 906 at server 134. When executed, the workflow steps of workflow logic 120 are performed in the configured sequence. Accordingly, one or more of the workflow steps may make calls to corresponding applications/services to perform their functions, such as local application 122 (to return data 132), network-based application 124A (to return data 130A), network-based application 124B (to return data 130B), and/or other local or network-based applications.

In step 1004, the workflow GUI is displayed. Step 1004 is optional, as in some embodiments, a GUI is not displayed for a workflow. In an embodiment, the GUI may be displayed by workflow application 904 at computing device 902. When displayed, the user may interact with the GUI by reviewing displayed data (e.g., from a file, database record, spreadsheet, or other data structure read by the workflow), by entering data into the GUI (e.g., by typing, by voice, etc.), and/or by interacting with one or more controls displayed by the GUI.

In step 1006, workflow logic is triggered based on an interaction with the workflow. Step 1006 is optional in cases where one or more workflow steps of a workflow require input from a user. In such cases, the user interacts with a control in a GUI of workflow application 904 associated with a workflow step of workflow logic 120 to provide information that triggers logic of the workflow step to operate.

In this manner, workflow logic 120 performs its functions, such as processing orders, tracking information, generating messages, processing documents to generate tasks or information, collecting feedback, and/or any other functions.

C. Example Embodiments for Selective Allocation of Different-Sized Portions of a Display Area to Different Workflow Step Representations As was previously described, workflow designer 106 generates workflow designer GUI 116 that enables a developer to add workflow steps to a workflow under development as well as to configure such steps. In an embodiment that will now be described, workflow designer GUI 116 is configured to selectively and dynamically allocate relatively more of a display area to a particular one of a plurality of different, simultaneously-displayed workflow step representations than is allocated to the other workflow step representation(s) to facilitate developer interaction with the particular workflow step representation. Such allocation may be carried out in response to developer interaction with the particular workflow step representation or in response to a determination that a developer is otherwise focused on the particular workflow step representation. In embodiments, the workflow step representations represent different workflow steps in a series of workflow steps. In further embodiments, the workflow step representations represent different workflow steps that may be performed depending upon the evaluation of a condition.

This functionality will now be described in part in reference to FIG. 11, which depicts a flowchart 1100 of a method for selectively allocating different-sized portions of a display area to different workflow step representations within a workflow designer GUI, in accordance with an embodiment. The method of flowchart 1100 may be performed, for example by UI generator 110 of workflow designer 106 as previously described. For the sake of illustration, the description of flowchart 1100 will also reference FIGS. 12-14, each of which shows a different view of workflow designer GUI 116 displayed within browser window 402 of display screen 108 in an embodiment in which computing device 102 is a mobile computing device, such as a smart phone.

Figure 11:
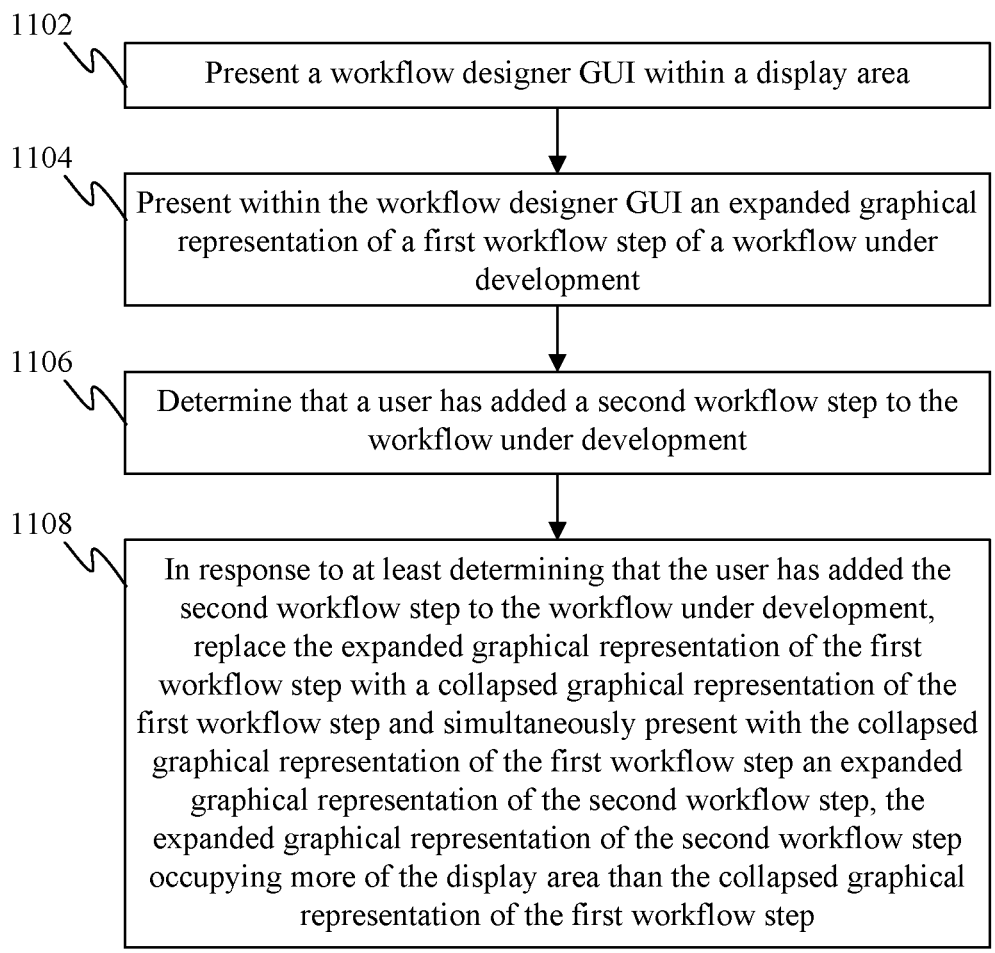
FIG. 11 depicts a flowchart of a method for selectively allocating different-sized portions of a display area to different workflow step representations within a workflow designer GUI, in accordance with an embodiment.

As shown in FIG. 11, the method of flowchart 1100 begins at step 1102, in which a workflow designer GUI is displayed within a display area. For example, in reference to FIG. 12, UI generator 110 may cause workflow designer GUI 116 to be displayed within a display area 1202 within browser window 402. In this particular embodiment, display area 1202 comprises a portion of a viewable area of display screen 108. However, in alternate embodiments, the display area may comprise all of the viewable area of a display screen. In still further embodiments, the display area is not limited to a display screen but may comprise any surface or space onto which 2D or 3D images may be projected, displayed, or otherwise presented.

At step 1104, an expanded graphical representation of a first workflow step of a workflow under development is presented within the workflow designer GUI. For example, with continued reference to FIG. 12, UI generator 110 may cause an expanded graphical representation 1204 of a first workflow step to be presented within workflow designer GUI 116. In this example, the first workflow step is a trigger step "Dropbox—When file is uploaded."

Figure 12:
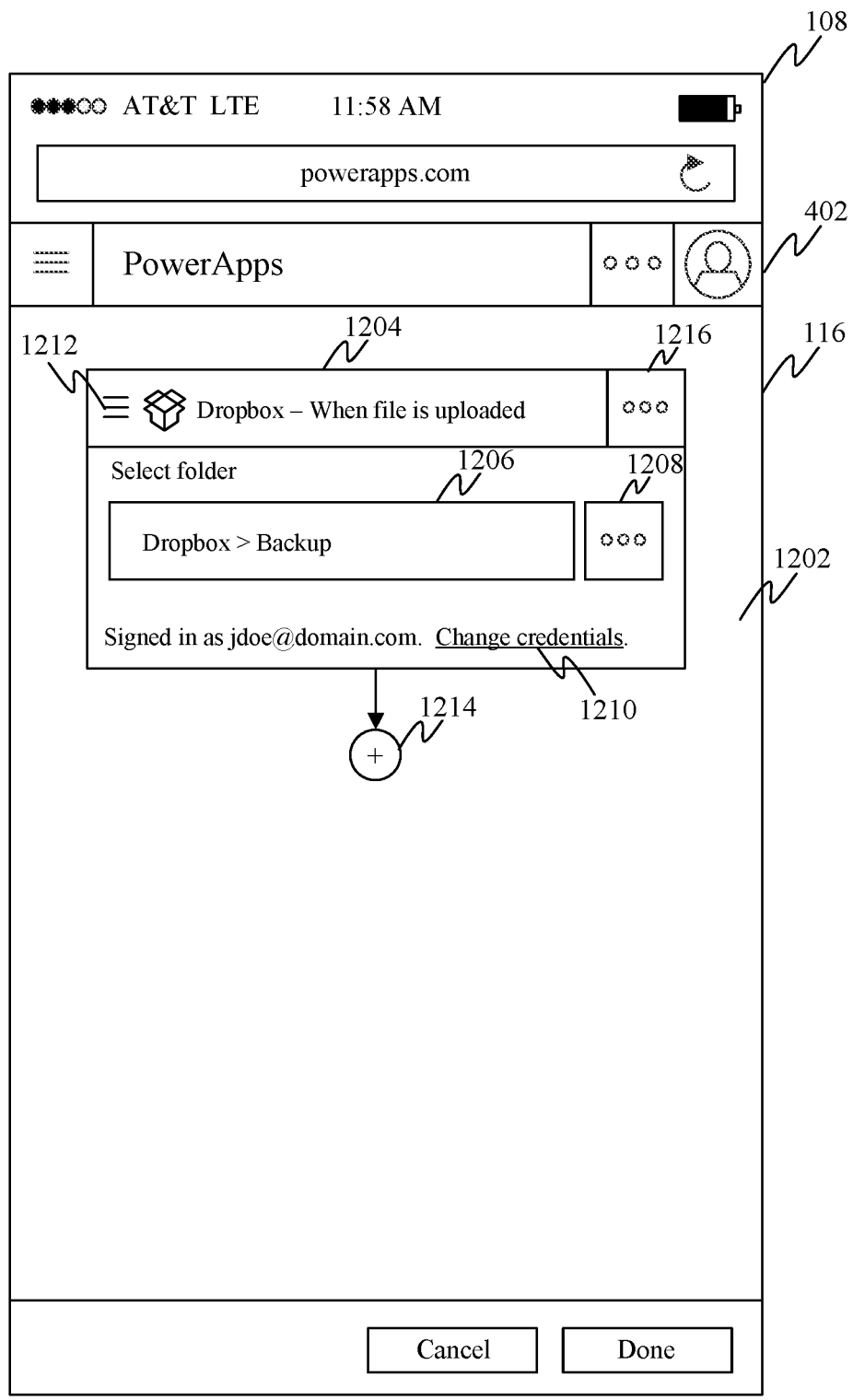
FIGS. 12-14 show views of a workflow designer GUI that selectively allocates different-sized portions of a display area to different workflow step representations in accordance with an embodiment.

As shown in FIG. 12, expanded graphical representation 1204 of the first workflow step includes a data entry element

1206 (in this example, a text box). Data entry element 1206 is operable to receive an input parameter associated with the first workflow step. In this example, the input parameter is the name of a Dropbox® folder to be monitored for the uploading of a file. The developer may type the name of the folder into data entry element 1206 or may utilize a file browser activator 1208 to activate a file browsing mechanism to select the name of the folder for insertion into data entry element 1206. In this example, the developer has specified the folder "Dropbox>Backup."

As further shown in FIG. 12, expanded graphical representation 1204 of the first workflow step includes an interactive control element 1210 that a developer can interact with to change a connection associated with the first workflow step. Changing a connection may entail, for example, providing a new set of credentials (e.g., a login ID and password) to enable a different account, data or functionality to be accessed at runtime in association with the first workflow step. In this particular example, the developer has connected the first workflow step to the account jdoe@domain.com.

Figure 13:
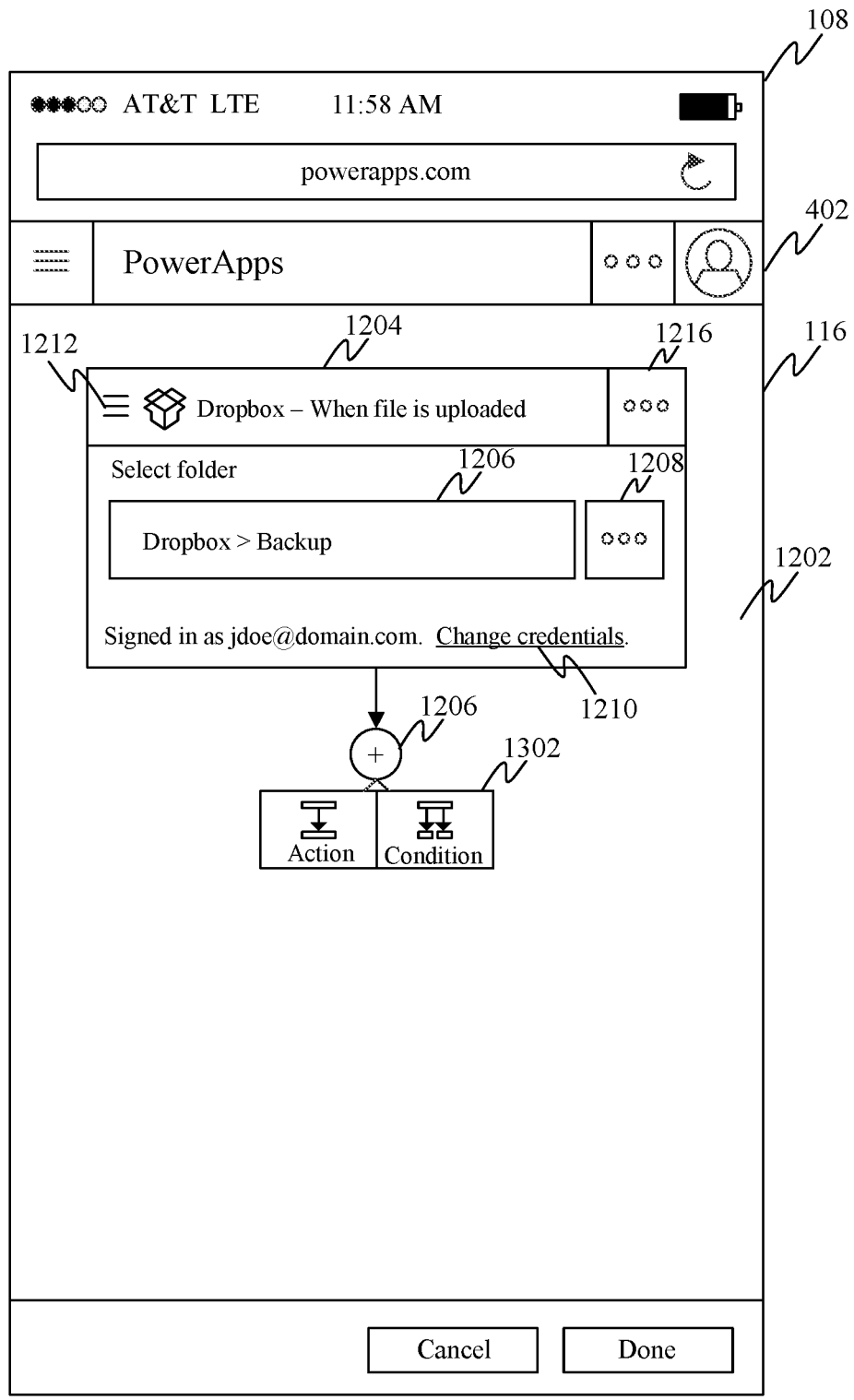

At step 1106, it is determined that a developer has added a second workflow step to the workflow under development. For example, with continued reference to FIG. 12, a developer may interact with (point and click with a mouse, touch via a touch screen, etc.) an interactive control element 1214 (also referred to herein as an add interface) to indicate that he or she wishes to add a second workflow step to the workflow under development. In response to this interaction, UI generator 110 may cause another interactive control element 1302 to be presented within workflow designer GUI 116 as shown in FIG. 13. By interacting with the left side of interactive control element 1302 (labelled "action"), the developer can select an action as the second workflow step within the workflow under development and by interacting with the right side of interactive control element 1302 (labelled "condition"), the developer can select a condition as the second workflow step within the workflow under development.

For the purposes of this example, it is assumed that the developer has selected an action and, through further interactions with workflow designer GUI 116 (not described herein for the sake of brevity), has added the particular action "Outlook—Send email for approval" as the second workflow step in the workflow under development.

At step 1108, in response to at least determining that the developer has added the second workflow step to the workflow under development, the expanded graphical representation of the first workflow step is replaced with a collapsed graphical representation of the first workflow step and an expanded graphical representation of the second workflow step is simultaneously presented with the collapsed graphical representation of the first workflow step within the display area. As further noted in step 1108, the expanded graphical representation of the second workflow step occupies more of the display area than the collapsed graphical representation of the first workflow step.

Figure 14:
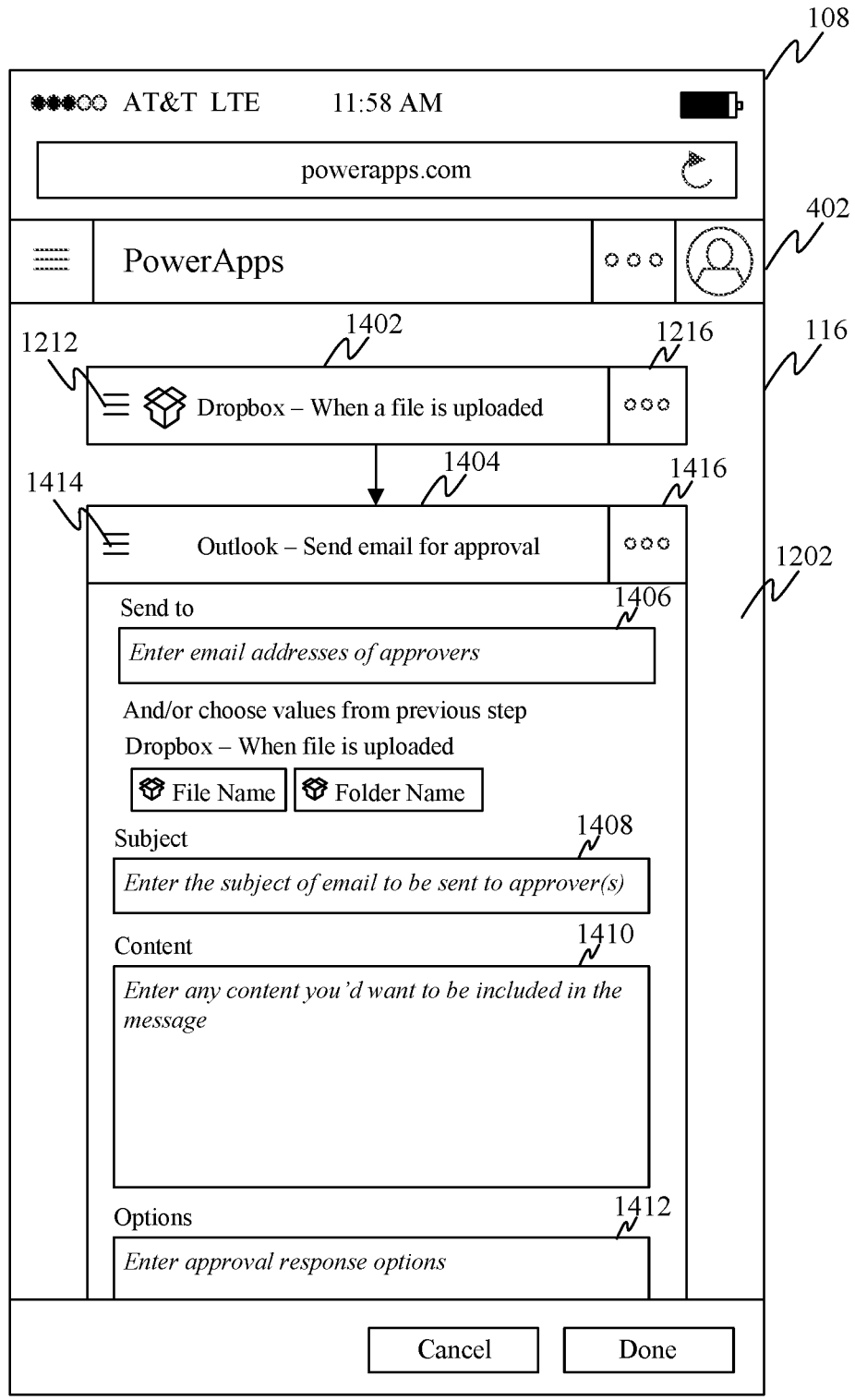

One implementation of step 1108 will now be described in reference to FIG. 14. As shown in FIG. 14, in response to at least determining that the developer has added the workflow step "Outlook—Send email for approval" to the workflow under development, UI generator 110 replaces expanded graphical representation 1204 of the first workflow step with a collapsed graphical representation 1402 of the first workflow step and also causes an expanded graphical representation 1404 of the second workflow step to be simultaneously presented with collapsed graphical representation 1402 of the first workflow step within display area 1202. Expanded graphical representation 1404 of the second workflow step occupies more of display area 1202 than collapsed graphical representation 1404 of the first workflow step.

As shown in FIG. 14, collapsed graphical representation 1402 of the first workflow step does not include data entry element 1206 or any other data entry elements. Also, collapsed graphical representation 1402 of the first workflow step also does not include interactive control element 1210 that the developer can interact with to change the connection associated with the first workflow step. Consequently, collapsed graphical representation 1402 provides a compact graphical representation of the first workflow step that consumes less area within display area 1202 than expanded graphical representation 1204 of the first workflow step or expanded graphical representation 1404 of the second workflow step. This advantageously provides more space within the limited display area 1202 for displaying the expanded graphical representation 1404 of the second workflow step, so that the developer can more easily configure that step.

As further shown in FIG. 14, expanded graphical representation 1404 of the second workflow step includes a data entry element 1406, a data entry element 1408, a data entry element 1410 and a data entry element 1412. Each of these data entry elements is operable to receive a corresponding input parameter associated with the second workflow step. In particular, data entry element 1406 is operable to receive an email address of a recipient of an email to be sent by the second workflow step, data entry element 1408 is operable to receive a subject line of the email to be sent by the second workflow step, data entry element 1410 is operable to receive content of an email to be sent by the second workflow step and data entry element 1412 is operable to receive approval response options associated with the second workflow step. A developer may interact with each of these data entry elements to provide the corresponding input parameter.

Although not shown in FIG. 14, expanded graphical representation 1404 of the second workflow step may also include an interactive control element that a developer can interact with to change a connection associated with the second workflow step. Changing a connection may entail, for example, providing a new set of credentials (e.g., a login ID and password) to enable a different account, data or functionality to be accessed at runtime in association with the second workflow step.

Further functionality of embodiments will now be described in reference to FIG. 15, which depicts a flowchart 1500 of a further method for selectively allocating different-sized portions of a display area to different workflow step representations within a workflow designer GUI. The method of flowchart 1500 may be performed, for example by UI generator 110 of workflow designer 106 as previously described. The method of flowchart 1500 may be performed subsequent to the performance of the method of flowchart 1100 as previously described. For the sake of illustration, the description of flowchart 1500 will also reference FIG. 16, which shows a view of workflow designer GUI 116 displayed within browser window 402 of display screen 108 in an embodiment in which computing device 102 is a mobile computing device, such as a smart phone.

Figure 15:
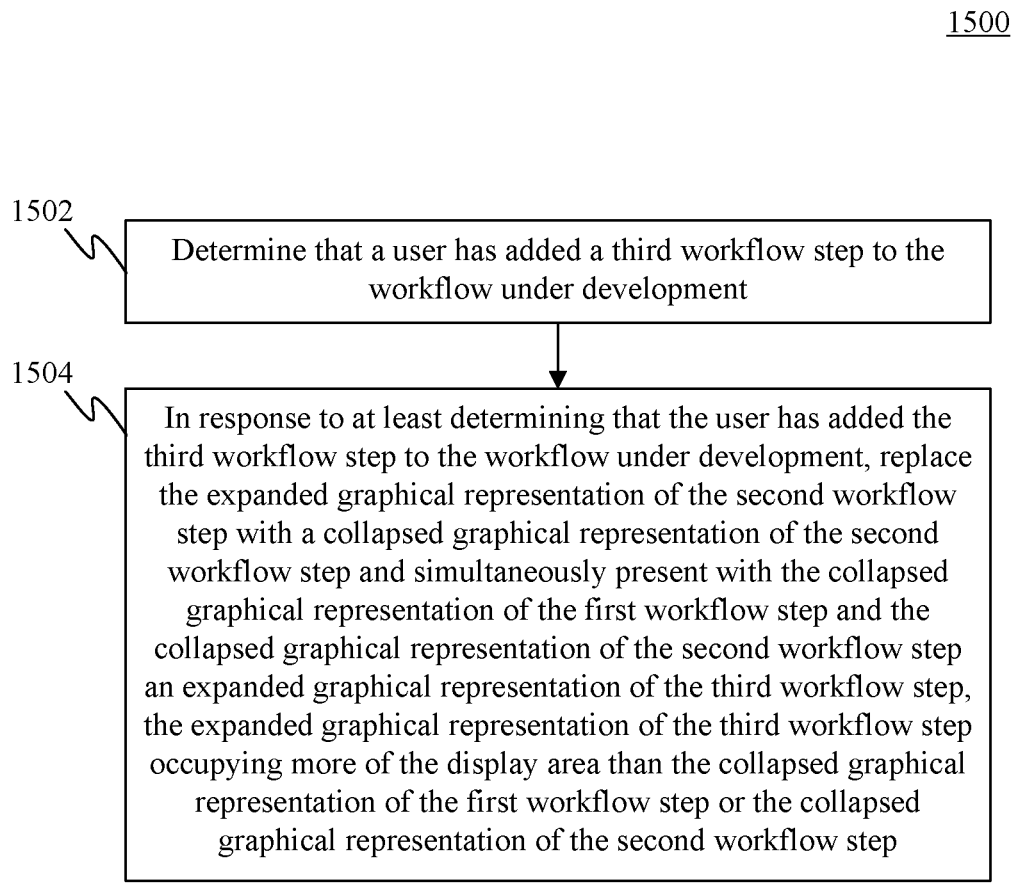
FIG. 15 depicts a flowchart of a further method for selectively allocating different-sized portions of a display area to different workflow step representations within a workflow designer GUI, in accordance with an embodiment.

As shown in FIG. 15, the method of flowchart 1500 begins at step 1502, in which it is determined that a developer has added a third workflow step to the workflow under development. For example, with reference to FIG. 16, a developer may interact with workflow designer GUI 116 to add a "Condition" as the third workflow step in the workflow under development.

At step 1504, in response to at least determining that the developer has added the third workflow step to the workflow under development, the expanded graphical representation of the second workflow step is replaced with a collapsed graphical representation of the second workflow step and an expanded graphical representation of the third workflow step is simultaneously presented with the collapsed graphical representation of the first workflow step and the collapsed graphical representation of the second workflow step within the display area. As further noted in step 1504, the expanded graphical representation of the third workflow step occupies more of the display area than the collapsed graphical representation of the first workflow step or the collapsed graphical representation of the second workflow step.

Figure 16:
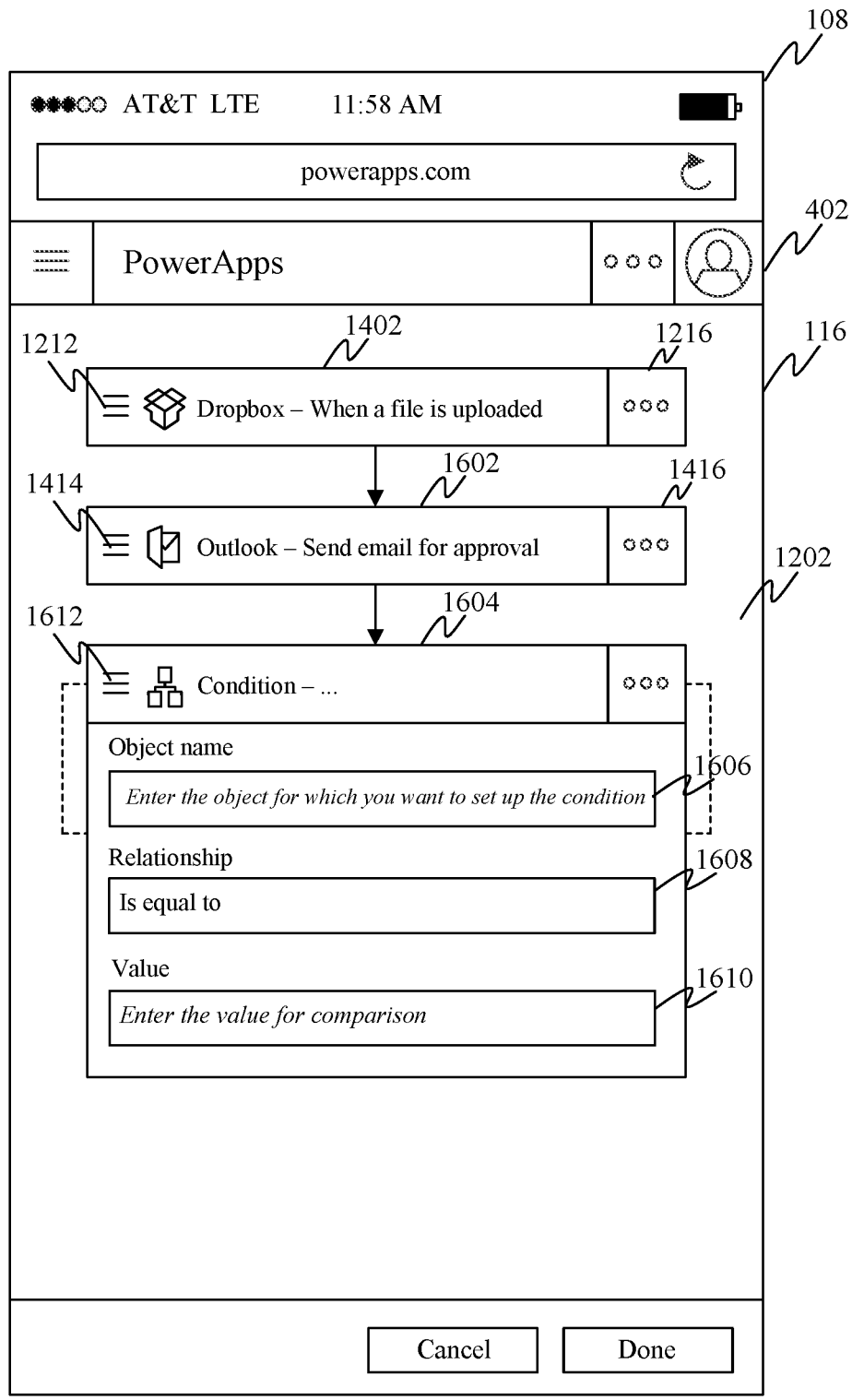
FIG. 16 shows a view of a workflow designer GUI that selectively allocates different-sized portions of a display area to different workflow step representations in accordance with an embodiment.

One implementation of step 1504 will now be described with continued reference to FIG. 16. As shown in FIG. 16, in response to at least determining that the developer has added the "Condition" workflow step to the workflow under development, UI generator 110 replaces expanded graphical representation 1404 of the second workflow step with a collapsed graphical representation 1602 of the second workflow step and also causes an expanded graphical representation 1604 of the third workflow step to be simultaneously presented with collapsed graphical representation 1402 of the first workflow step and collapsed graphical representation 1602 of the second workflow step within display area 1202. Expanded graphical representation 1604 of the third workflow step occupies more of display area 1202 than collapsed graphical representation 1404 of the first workflow step.

As shown in FIG. 16, collapsed graphical representation 1602 of the second workflow step does not include data entry elements 1406, 1408, 1410 or 1412, or any other data entry elements. Also, collapsed graphical representation 1602 of the second workflow step also does not include any interactive control element that the developer can interact with to change the connection associated with the second workflow step. Consequently, collapsed graphical representation 1602 provides a compact graphical representation of the second workflow step that consumes less area within display area 1202 than expanded graphical representation 1404 of the second workflow step or expanded graphical representation 1604 of the third workflow step. This advantageously provides more space within the limited display area 1202 for displaying the expanded graphical representation 1604 of the third workflow step, so that the developer can more easily configure that step.

As further shown in FIG. 16, expanded graphical representation 1604 of the third workflow step includes a data entry element 1606, a data entry element 1608 and a data entry element 1610. A developer may interact with data entry element 1606 to identify an object for which a condition is to be established. The developer may also interact with data entry element 1608 to specify a relationship (e.g., is greater than, is less than, is equal to, is greater than or equal to, is less than or equal to, etc.). The developer may also interact with data entry element 1610 to input a value. The identification of the object is received by workflow designer 106 via data entry element 1606, the specification of the relationship is received by workflow designer 106 via data entry element 1608, and the value is received by workflow designer 106 via data entry element 1610. In an embodiment, workflow logic generator 112 of workflow designer 106 generates workflow logic 120 such that the condition of the third workflow step is met at runtime if the object identified via data entry element 1606 has the relationship specified via data entry element 1608 to the value input via data entry element 1610 and the condition of the third workflow step is not met at runtime if the object identified via data entry element 1606 does not have the relationship specified via data entry element 1608 to the value input via data entry element 1610. Further features relating to condition workflow steps will be discussed below.

In an embodiment, each of the expanded and collapsed graphical representations of a given workflow step presented by UI generator 110 may include an interactive control element that a developer can interact with to toggle or switch between the expanded and collapsed graphical representations of that workflow step. For example, as shown in FIGS. 12-14 and 16, both expanded graphical representation 1204 of the first workflow step and collapsed graphical representation 1402 of the first workflow step include an interactive control element 1212 that a developer can interact with to switch from expanded graphical representation 1204 to collapsed graphical representation 1402 and vice versa. Likewise, as shown in FIGS. 14 and 16, both expanded graphical representation 1404 of the second workflow step and collapsed graphical representation 1602 of the second workflow step include an interactive control element 1414 that a developer can interact with to switch from expanded graphical representation 1404 to collapsed graphical representation 1602 and vice versa. This functionality advantageously enables the developer to selectively expand workflow step representations as needed to inspect and/or modify their configurations and to selectively collapse workflow step representations when done inspecting/modifying them, thereby freeing up more display area for working with other workflow steps.

In a further embodiment, each of the expanded and collapsed graphical representations of a given workflow step presented by UI generator 110 may include an interactive control element that a developer can interact with to enable the developer to selectively edit, rename or delete that workflow step. For example, as shown in FIGS. 12-14 and 16, both expanded graphical representation 1204 of the first workflow step and collapsed graphical representation 1402 of the first workflow step include an interactive control element 1216. In response to developer interaction with interactive control element 1216, UI generator 110 may present a menu or other means by which the developer can select from among editing, renaming or deleting the first workflow step. Likewise, as shown in FIGS. 14 and 16, both expanded graphical representation 1404 of the second workflow step and collapsed graphical representation 1602 of the second workflow step include an interactive control element 1416. In response to developer interaction with interactive control element 1416, UI generator 110 may present a menu or other means by which the developer can select from among editing, renaming or deleting the second workflow step.

Further functionality of embodiments will now be described in reference to FIG. 17, which depicts a flowchart 1700 of a further method for selectively allocating different-sized portions of a display area to different workflow step representations within a workflow designer GUI. The method of flowchart 1700 may be performed, for example by UI generator 110 of workflow designer 106 as previously described. For the sake of illustration, the description of flowchart 1700 will also reference FIGS. 18-21, each of which shows a different view of workflow designer GUI 116 displayed within browser window 402 of display screen 108 in an embodiment in which computing device 102 is a mobile computing device, such as a smart phone.

Figure 17:
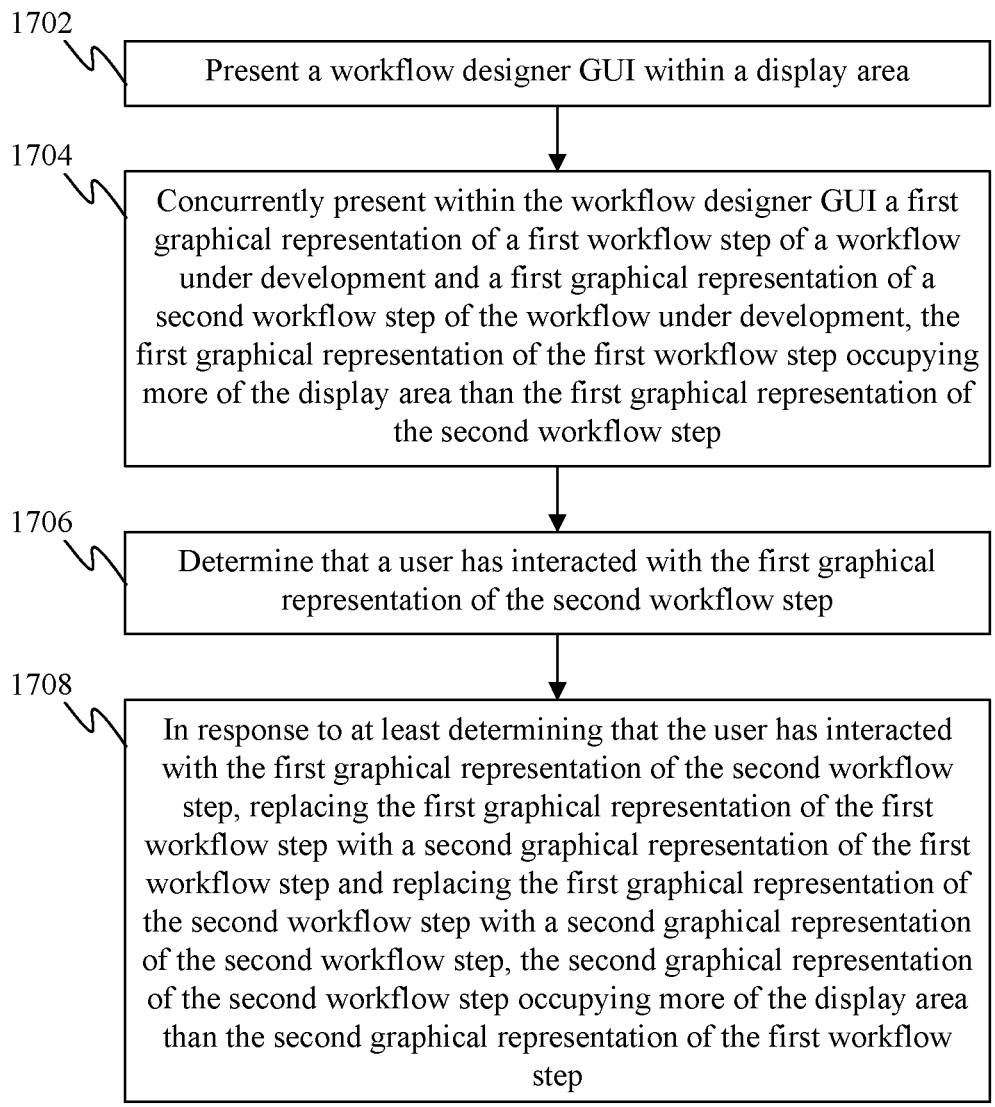
FIG. 17 depicts a flowchart of a method for selectively allocating different-sized portions of a display area to different workflow step representations within a workflow designer GUI, in accordance with an embodiment.

As shown in FIG. 17, the method of flowchart 1700 begins at step 1702, in which a workflow designer GUI is displayed within a display area. For example, in reference to FIG. 18, UI generator 110 may cause workflow designer GUI 116 to be displayed within display area 1202 within browser window 402. In this particular embodiment, display area 1202 comprises a portion of a viewable area of display screen 108. However, in alternate embodiments, the display area may comprise all of the viewable area of a display screen. In still further embodiments, the display area is not limited to a display screen but may comprise any surface or space onto which 2D or 3D images may be projected, displayed, or otherwise presented.

At step 1704, a first graphical representation of a first workflow step of a workflow under development and a first graphical representation of a second workflow step of the workflow under development are concurrently presented within a workflow designer GUI. In accordance with this step, the first graphical representation of the first workflow step occupies more of the display area than the first graphical representation of the second workflow step.

Figure 18:
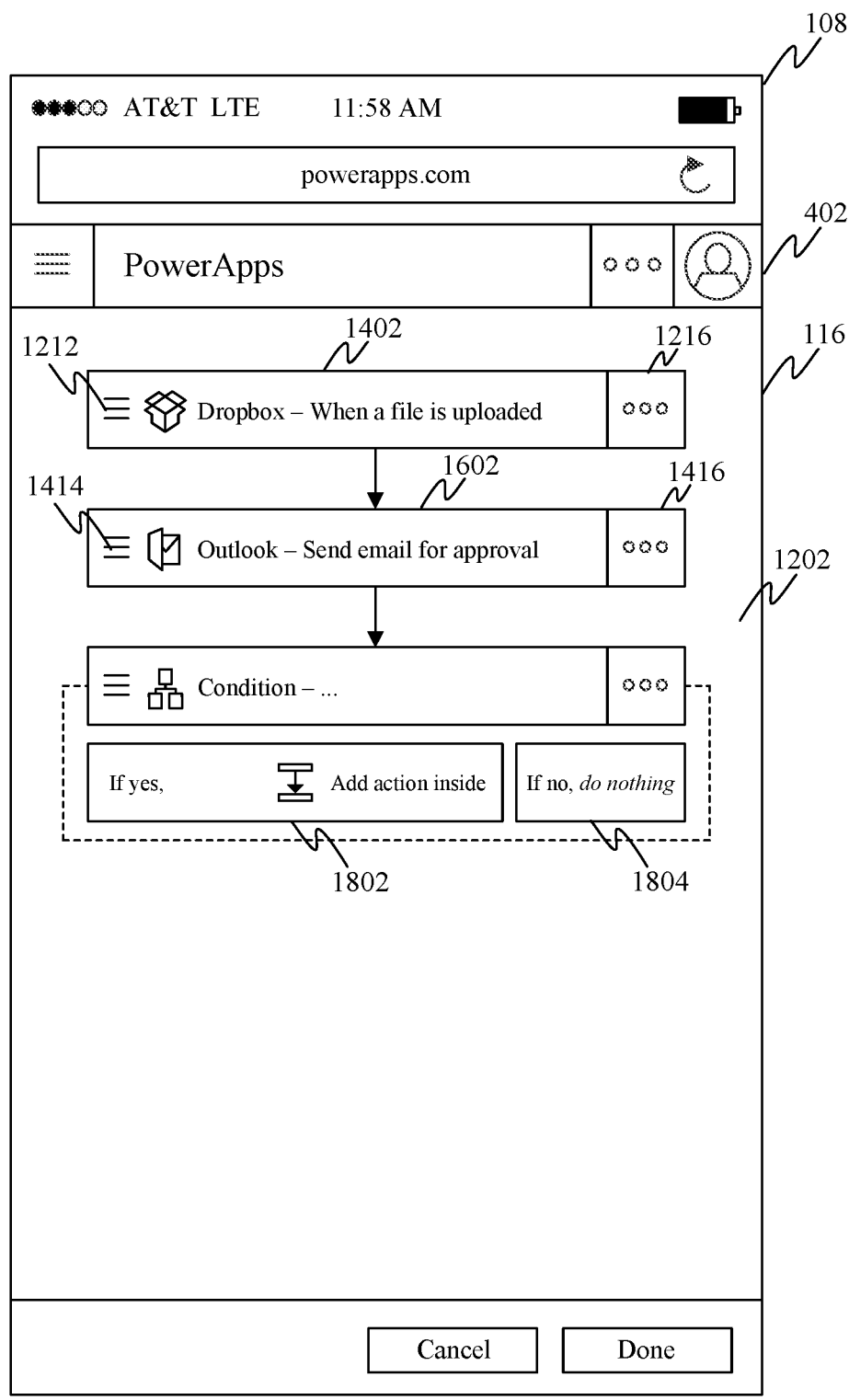
FIGS. 18-21 show views of a workflow designer GUI that selectively allocates different-sized portions of a display area to different workflow step representations in accordance with an embodiment.

One implementation of this step is shown in FIG. 18, in which UI generator 110 causes a first graphical representation 1802 of a first workflow step and a first graphical representation 1804 of a second workflow step to be presented in a side-by-side manner within workflow designer GUI 116. As shown in FIG. 18, first graphical representation 1802 of the first workflow step occupies more of display area 1202 than first graphical representation 1804 of the second workflow step. In this example, each of first graphical representation 1802 and first graphical representation 1804 comprise user-interactive representations in that a developer can interact with (point and click with a mouse, touch via a touch screen, etc.) each of the graphical representations to configure the corresponding workflow step.

In further accordance with the example of FIG. 18, the first workflow step comprises a workflow step to be performed if a condition evaluated at runtime is met and the second workflow step comprising a workflow step to be performed if the condition evaluated at runtime is not met. As discussed above, the condition to be evaluated at runtime can be defined by a developer by identifying an object for which the condition is to be established via a data entry element 1606, by specifying a relationship via a data entry element 1608, and by inputting a value via a third data entry element 1610. The condition is deemed met if the object has the relationship to the value and the condition is not met if the object does not have the relationship to the value. In one embodiment, first graphical representation 1802 of the first workflow step and first graphical representation 1804 of the second workflow step are presented in response to determining that the user has identified the object via data entry element 1606, specified the relationship via data entry element 1608, and input the value via third data entry element 1610.

Figure 19:
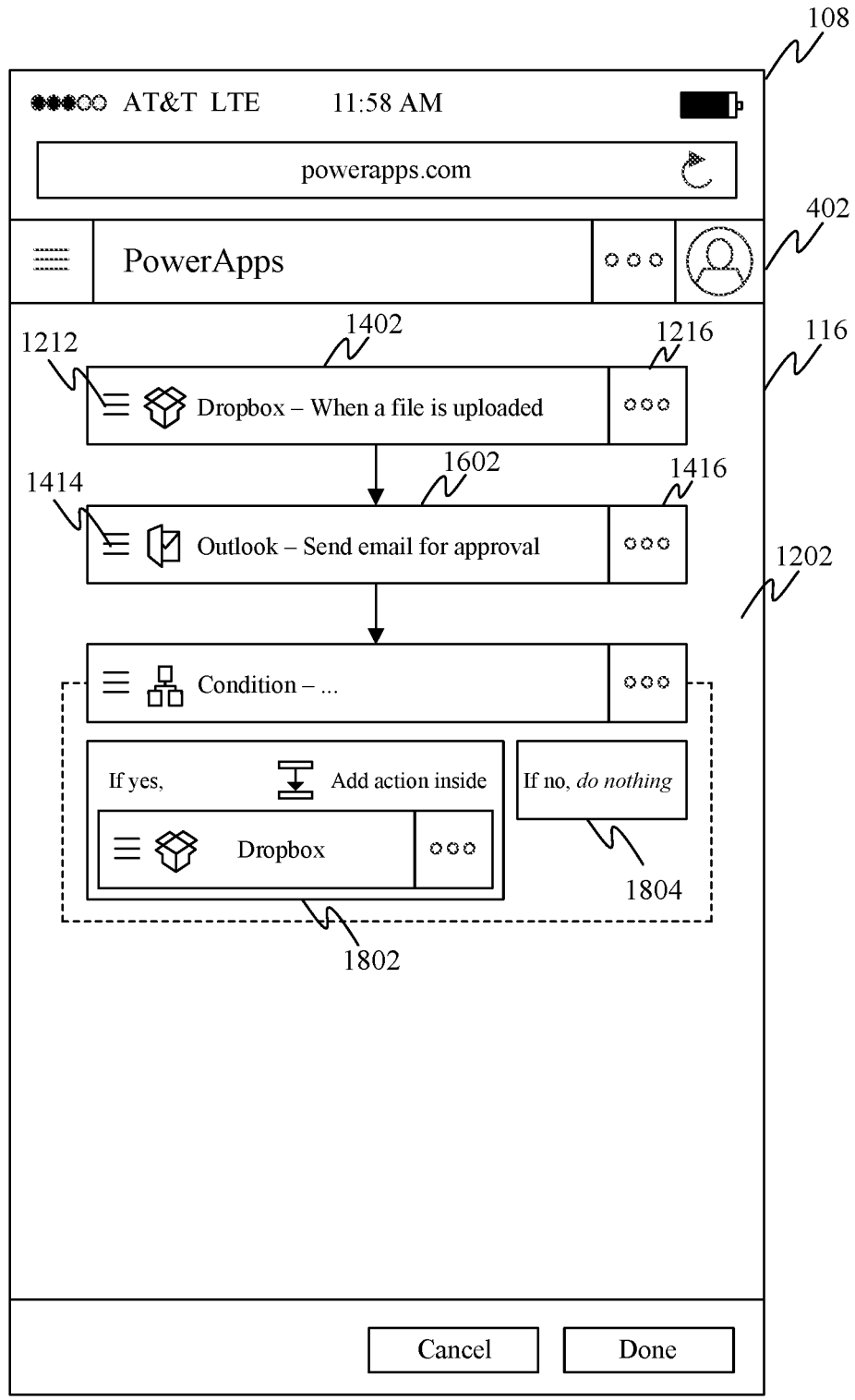

As shown in FIG. 19, the developer can interact with first graphical representation 1802 of the first workflow step to specify an action to be taken during that workflow step. In this example, an action involving Dropbox® has been added to the first workflow step. The developer can also interact with first graphical representation 1804 of the second workflow step.

Returning now to the description of flowchart 1700, at step 1706, it is determined that the developer has interacted with the first graphical representation of the second workflow step. For example, with continued reference to FIG. 19, UI generator 110 may determine (e.g., by receiving an indication from workflow designer GUI 116) that the developer has interacted with (pointed and click with a mouse, touched via a touch screen, etc.) first graphical representation 1804 of the second workflow step.

At step 1708, in response to determining that the user has interacted with the first graphical representation of the second workflow step, the first graphical representation of the first workflow step is replaced with a second graphical representation of the first workflow step and the first graphical representation of the second workflow step is replaced with a second graphical representation of the second workflow step. In accordance with this step, the second representation of the second workflow step occupies more of the display area than the second representation of the first workflow step.

Figure 20:
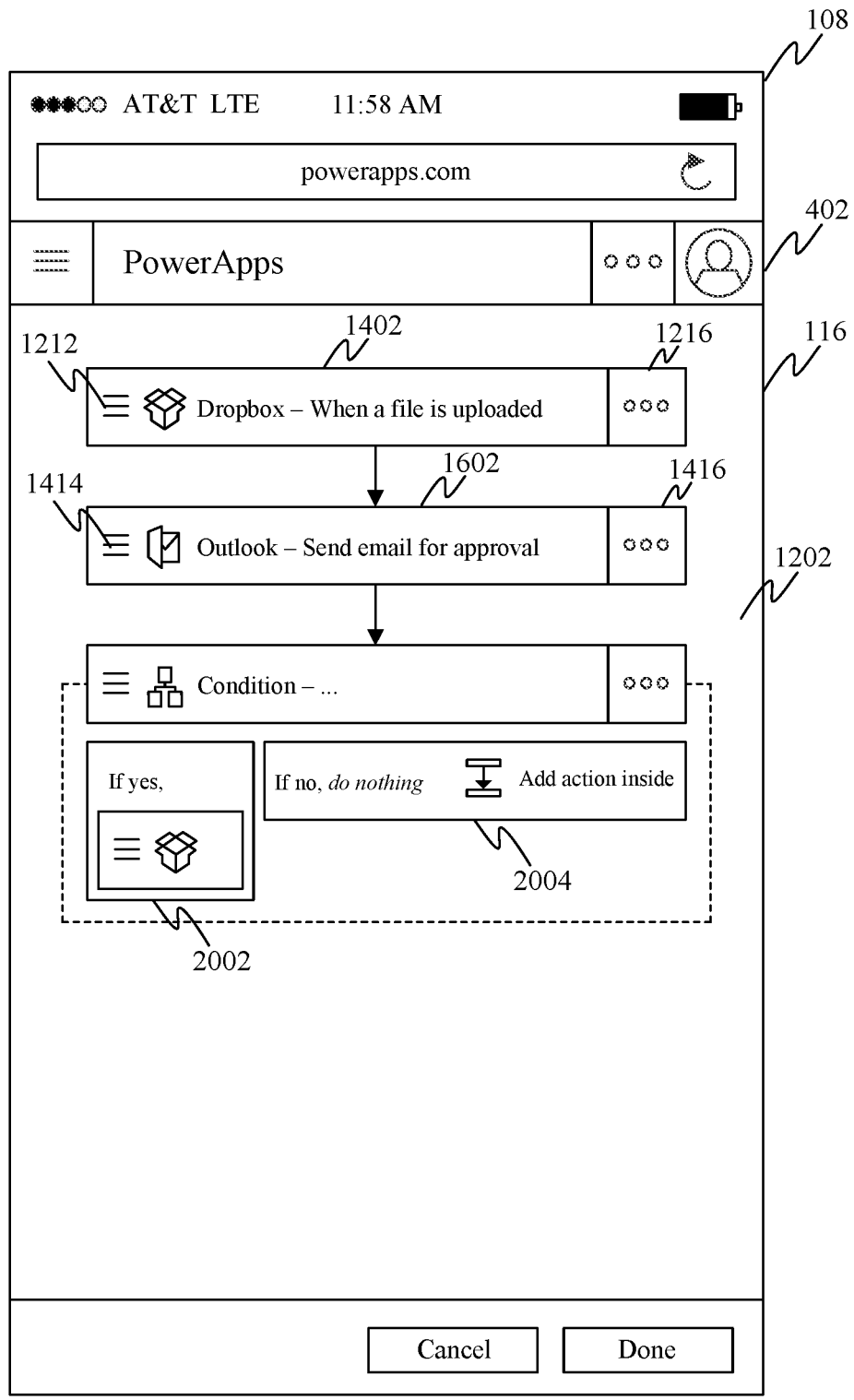
Figure 21:
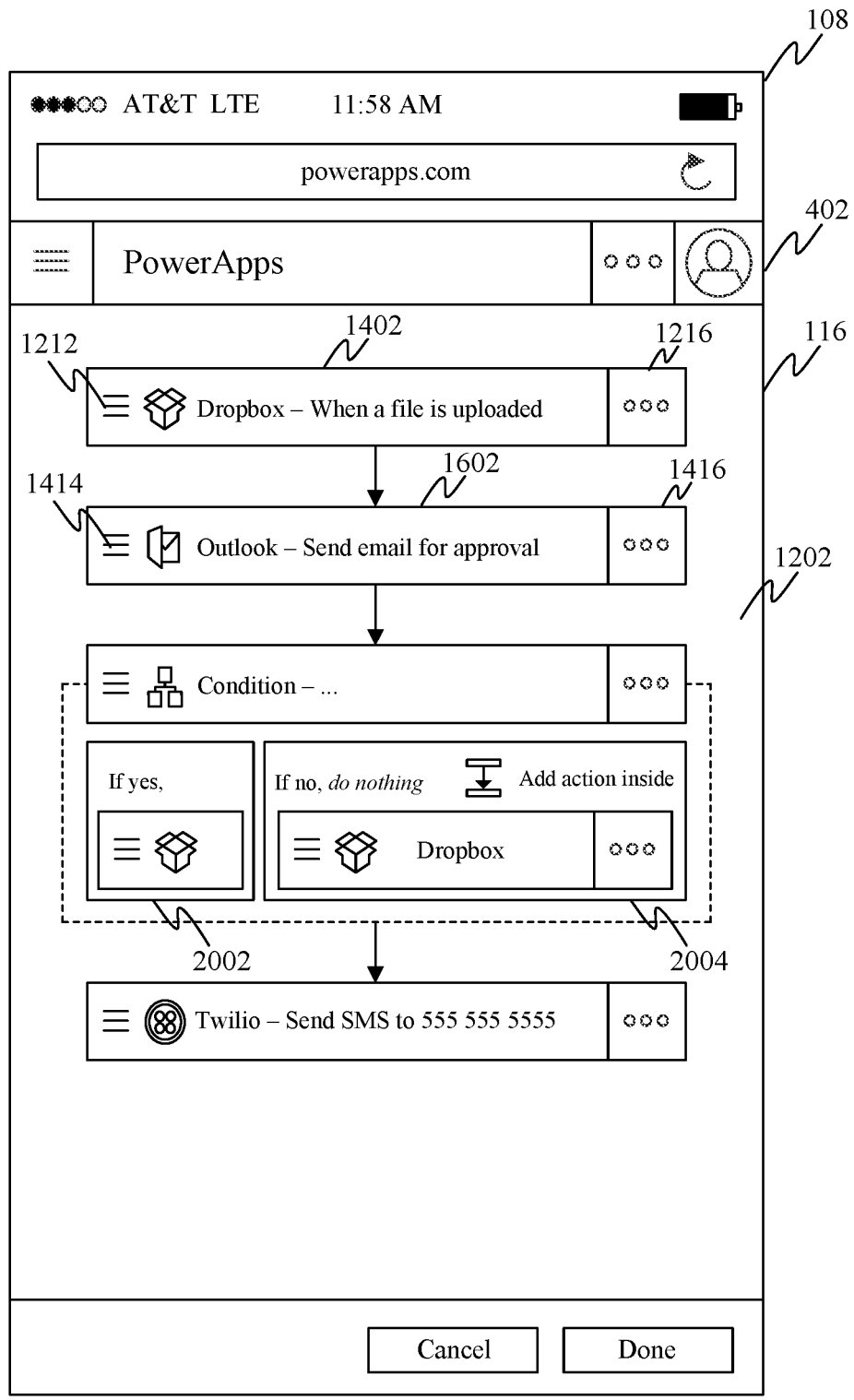

One implementation of this step is shown in FIG. 20, in which UI generator 110 replaces first graphical representation 1802 of the first workflow step with a second graphical representation 2002 of the first workflow step and replaces first graphical representation 1804 of the second workflow step with a second graphical representation 2004 of the second workflow step. As shown in FIG. 20, second representation 2004 of the second workflow step occupies more of display area 1202 than second representation 2002 of the first workflow step. As shown in FIG. 21, the developer can interact with second graphical representation 2004 of the second workflow step to specify an action to be taken during that workflow step. In this example, an action involving Dropbox® has also been added to the second workflow step.

As shown in the foregoing, UI generator 110 selectively and dynamically allocates more display area space to the graphical representation of whichever of the first and second workflow steps the developer is currently interacting with. That is to say, UI generator 110 expands one workflow step while shrinking the other. In this way, UI generator 110 enables the developer to work with one conditional branch while still continuing to show the other conditional branch. This advantageously enables the developer to maintain a sense of the logical structure of the workflow under development (and in particular the branching logic) while still providing sufficient space for the developer to configure a single one of the multiple conditional branches. Such an approach to automated workflow development is particularly well-suited for devices having small form factors, such as tablets and smartphones although the advantages of this approach are not limited to small form factor devices.

The method of flowchart 1700 is not limited to workflow steps that are performed in response to the evaluation of a condition. For example, the method of flowchart 1700 may also be applied to workflow steps in a series of workflow steps. For example, referring again to FIG. 21, in response to a developer interaction with collapsed graphical representation 1402 of the workflow step "Dropbox—When a file is uploaded," UI generator 110 may cause the graphical representation of that workflow step to expand, and may also collapse the graphical representations of all the other workflow steps. In this way, the overall logical structure of the workflow may still be shown within the display area, but more space is allocated to the workflow step with which the developer is trying to interact.

In the foregoing description of flowchart 1700, the determination of which workflow step representation to expand and which workflow step representation to contract is based on a developer's interaction with a particular workflow step representation. However, in alternate embodiments, the determination of which workflow step representation to expand and which workflow step representation to contract may be based on other factors. For example, any of a wide variety of eye-gaze tracking technologies or head tracking technologies may be used to determine which of a plurality of workflow step representations a developer is currently looking at or focusing on. In accordance with such embodiments, the workflow step representation that is currently being looked at or focused on by the developer may be expanded while the other workflow step representations may be contracted. In still other embodiments, one or more microphones and a speech recognition system may be used to enable a developer to speak the name of a particular workflow step. In response, the graphical representation of the particular workflow step may be expanded, while the graphical representations of the other workflow steps may be contracted. Still other methods may be used to determine which workflow step representation to expand and which workflow step representation to contract.

III. Example Mobile Device Implementation

Figure 22:
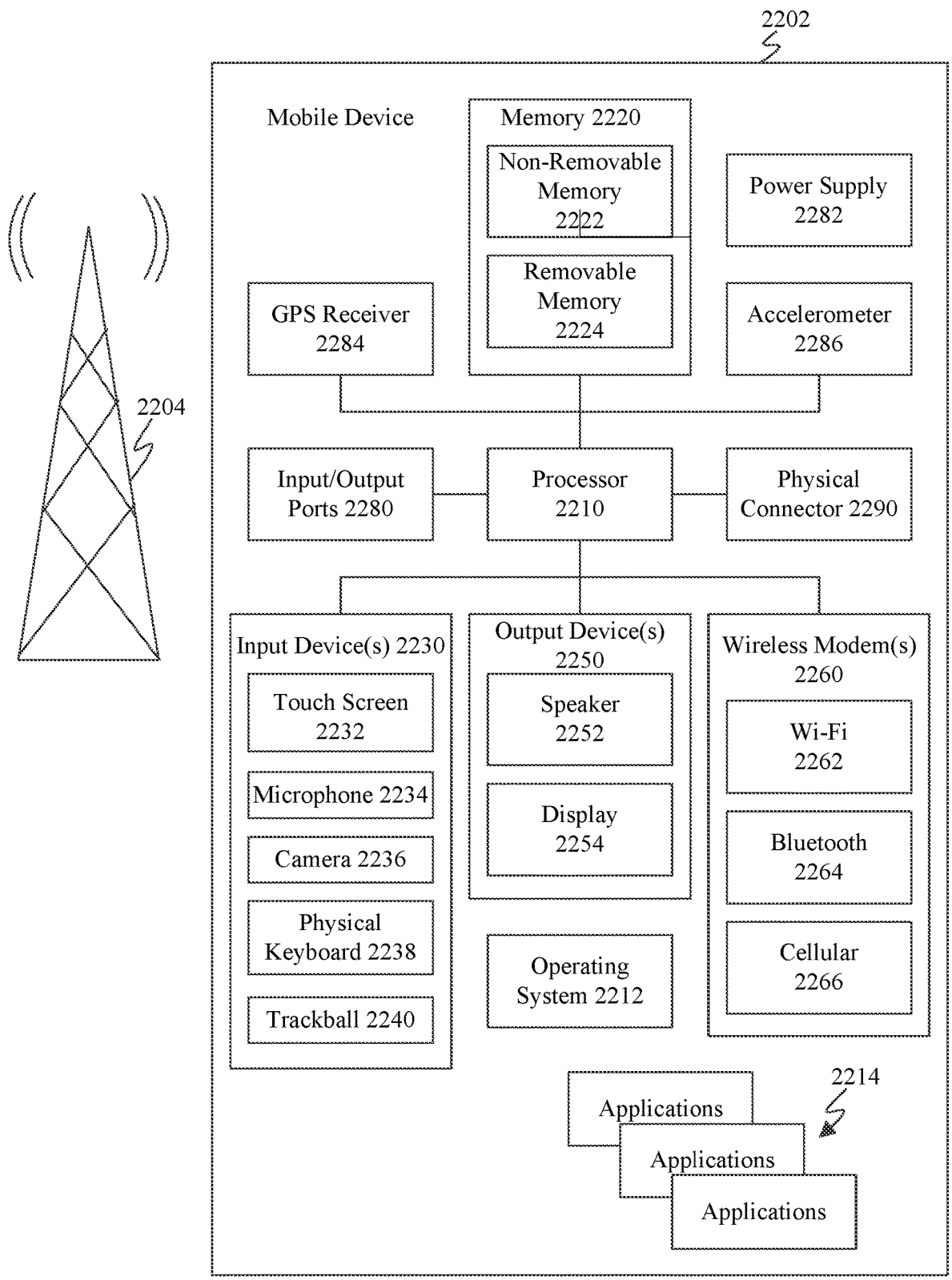
FIG. 22 is a block diagram of an example mobile device that may be used to implement various embodiments.

FIG. 22 is a block diagram of an exemplary mobile device 2202 that may implement embodiments described herein. For example, mobile device 2202 may be used to implement computing device 102 of FIG. 1 or computing device 902 of FIG. 9. As shown in FIG. 22, mobile device 2202 includes a variety of optional hardware and software components. Any component in mobile device 2202 can communicate with any other component, although not all connections are shown for ease of illustration. Mobile device 2202 can be any of a variety of computing devices (e.g., cell phone, smart phone, handheld computer, Personal Digital Assistant (PDA), etc.) and can allow wireless two-way communications with one or more mobile communications networks 2204, such as a cellular or satellite network, or with a local area or wide area network.

Mobile device 2202 can include a controller or processor 2210 (e.g., signal processor, microprocessor, ASIC, or other control and processing logic circuitry) for performing such tasks as signal coding, data processing, input/output processing, power control, and/or other functions. An operating system 2212 can control the allocation and usage of the components of mobile device 2202 and provide support for one or more application programs 2214 (also referred to as "applications" or "apps"). Application programs 2214 may include common mobile computing applications (e.g., e-mail applications, calendars, contact managers, web browsers, messaging applications) and any other computing applications (e.g., word processing applications, mapping applications, media player applications).

Mobile device 2202 can include memory 2220. Memory 2220 can include non-removable memory 2222 and/or removable memory 2224. Non-removable memory 2222 can include RAM, ROM, flash memory, a hard disk, or other well-known memory devices or technologies. Removable memory 2224 can include flash memory or a Subscriber Identity Module (SIM) card, which is well known in GSM communication systems, or other well-known memory devices or technologies, such as "smart cards." Memory 2220 can be used for storing data and/or code for running operating system 2212 and application programs 2214. Example data can include web pages, text, images, sound files, video data, or other data to be sent to and/or received from one or more network servers or other devices via one or more wired or wireless networks. Memory 2220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 2202 can support one or more input devices 2230, such as a touch screen 2232, a microphone 2234, a camera 2236, a physical keyboard 2238 and/or a trackball 2240 and one or more output devices 2250, such as a speaker 2252 and a display 2254. Other possible output devices (not shown) can include piezoelectric or other haptic output devices. Some devices can serve more than one input/output function. For example, touch screen 2232 and display 2254 can be combined in a single input/output device. Input devices 2230 can include a Natural User Interface (NUI).

Wireless modem(s) 2260 can be coupled to antenna(s) (not shown) and can support two-way communications between processor 2210 and external devices, as is well understood in the art. Modem(s) 2260 are shown generically and can include a cellular modem 2266 for communicating with the mobile communication network 2204 and/or other radio-based modems (e.g., Bluetooth 2264 and/or Wi-Fi 2262). At least one of wireless modem(s) 2260 is typically configured for communication with one or more cellular networks, such as a GSM network for data and voice communications within a single cellular network, between cellular networks, or between the mobile device and a public switched telephone network (PSTN).

Mobile device 2202 can further include at least one input/output port 2280, a power supply 2282, a satellite navigation system receiver 2284, such as a Global Positioning System (GPS) receiver, an accelerometer 2286, and/or a physical connector 2290, which can be a USB port, IEEE 1394 (FireWire) port, and/or RS-232 port. The illustrated components of mobile device 2202 are not required or all-inclusive, as any components can be deleted and other components can be added as would be recognized by one skilled in the art.

In an embodiment, mobile device 2202 is configured to implement any of the above-described features of workflow development system 100. Computer program logic for performing the functions of these devices may be stored in memory 2220 and executed by processor 2210.

IV. Example Computer System Implementation

Figure 23:
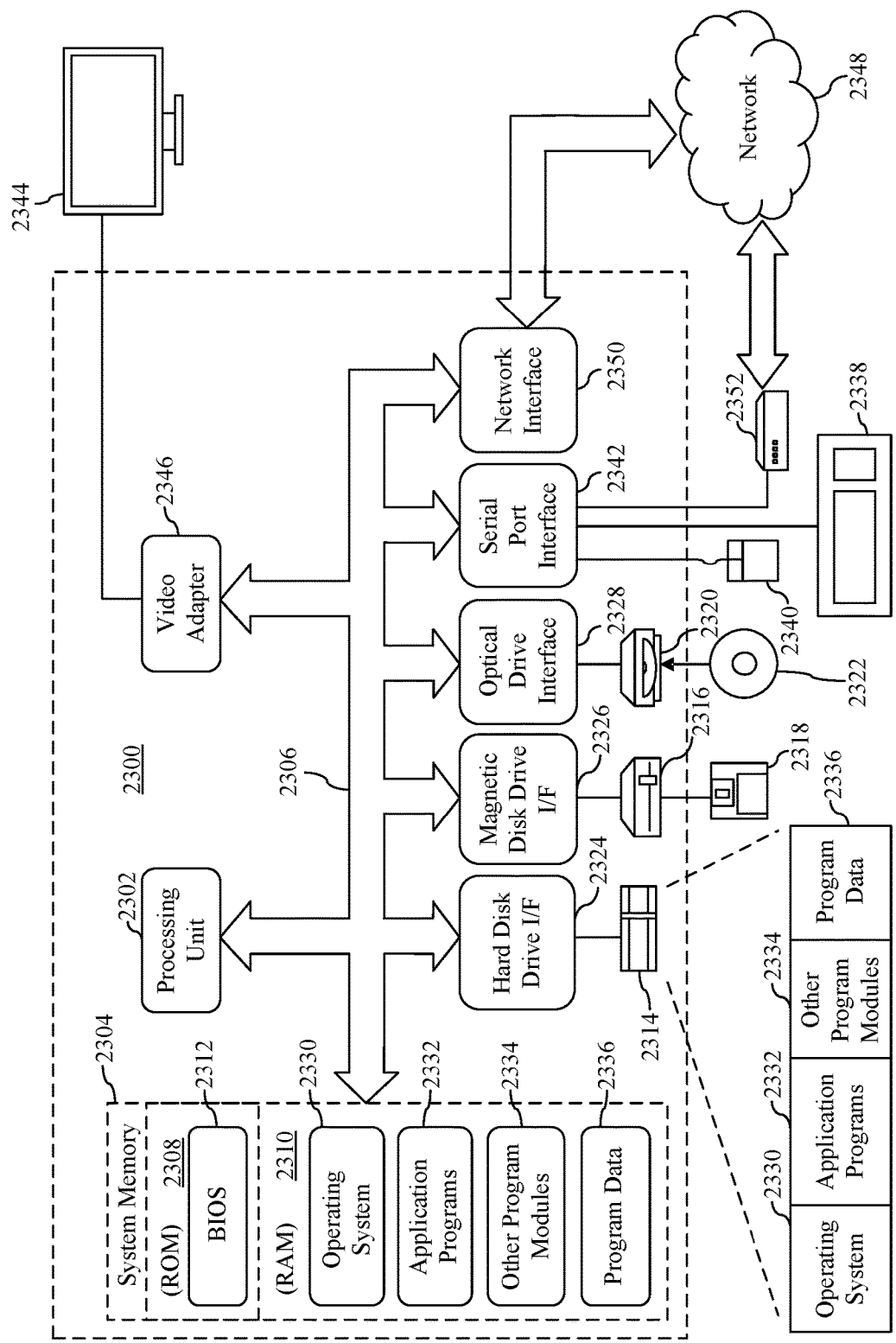
FIG. 23 is a block diagram of an example processor-based computer system that may be used to implement various embodiments.

FIG. 23 depicts an example processor-based computer system 2300 that may be used to implement various embodiments described herein. For example, system 2300 may be used to implement computing device 102 or server 134 as described above in reference to FIG. 1, or computing device 902 as described above in reference to FIG. 9. System 2300 may also be used to implement any of the steps of any of the flowcharts of FIGS. 2, 10, 11, 15 and 17 as described above. The description of system 2300 provided herein is provided for purposes of illustration, and is not intended to be limiting. Embodiments may be implemented in further types of computer systems, as would be known to persons skilled in the relevant art(s).

As shown in FIG. 23, system 2300 includes a processing unit 2302, a system memory 2304, and a bus 2306 that couples various system components including system memory 2304 to processing unit 2302. Processing unit 2302 may comprise one or more circuits, microprocessors or microprocessor cores. Bus 2306 represents one or more of any of several types of bus structures, including a memory bus or memory controller, a peripheral bus, an accelerated graphics port, and a processor or local bus using any of a variety of bus architectures. System memory 2304 includes read only memory (ROM) 2308 and random access memory (RAM) 2310. A basic input/output system 2312 (BIOS) is stored in ROM 2308.

System 2300 also has one or more of the following drives: a hard disk drive 2314 for reading from and writing to a hard disk, a magnetic disk drive 2316 for reading from or writing to a removable magnetic disk 2318, and an optical disk drive 2320 for reading from or writing to a removable optical disk 2322 such as a CD ROM, DVD ROM, BLU-RAY™ disk or other optical media. Hard disk drive 2314, magnetic disk drive 2316, and optical disk drive 2320 are connected to bus 2306 by a hard disk drive interface 2324, a magnetic disk drive interface 2326, and an optical drive interface 2328, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 2330, one or more application programs 2332, other program modules 2334, and program data 2336. In accordance with various embodiments, the program modules may include computer program logic that is executable by processing unit 2302 to perform any or all of the functions and features of computing device 102 or server 134 as described above in reference to FIG. 1, or computing device 902 as described above in reference to FIG. 9. The program modules may also include computer program logic that, when executed by processing unit 2302, causes processing unit 2302 to perform any of the steps of any of the flowcharts of FIGS. 2, 10, 11, 15 and 17 as described above.

A user may enter commands and information into system 2300 through input devices such as a keyboard 2338 and a pointing device 2340 (e.g., a mouse). Other input devices (not shown) may include a microphone, joystick, game controller, scanner, or the like. In one embodiment, a touch screen is provided in conjunction with a display 2344 to allow a user to provide user input via the application of a touch (as by a finger or stylus for example) to one or more points on the touch screen. These and other input devices are often connected to processing unit 2302 through a serial port interface 2342 that is coupled to bus 2306, but may be connected by other interfaces, such as a parallel port, game port, or a universal serial bus (USB). Such interfaces may be wired or wireless interfaces.

Display 2344 is connected to bus 2306 via an interface, such as a video adapter 2346. In addition to display 2344, system 2300 may include other peripheral output devices (not shown) such as speakers and printers.

System 2300 is connected to a network 2348 (e.g., a local area network or wide area network such as the Internet) through a network interface 2350, a modem 2352, or other suitable means for establishing communications over the network. Modem 2352, which may be internal or external, is connected to bus 2306 via serial port interface 2342.

As used herein, the terms "computer program medium," "computer-readable medium," and "computer-readable storage medium" are used to generally refer to memory devices or storage structures such as the hard disk associated with hard disk drive 2314, removable magnetic disk 2318, removable optical disk 2322, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 2332 and other program modules 2334) may be stored on the hard disk, magnetic disk, optical disk, ROM, or RAM. Such computer programs may also be received via network interface 2350, serial port interface 2342, or any other interface type. Such computer programs, when executed or loaded by an application, enable system 2300 to implement features of embodiments discussed herein. Accordingly, such computer programs represent controllers of the system 2300. Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 2300 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Additional Example Embodiments

A method in a computing device is described herein. The method includes: presenting a workflow designer graphical user interface (GUI) within a display area; concurrently presenting within the workflow designer GUI a first representation of a first workflow step of a workflow under development and a first representation of a second workflow step of the workflow under development, each of the first representations comprising a graphical and user-interactive representation, the first representation of the first workflow step occupying more of the display area than the first representation of the second workflow step; determining that a user has interacted with the first representation of the second workflow step; and in response to determining that the user has interacted with the first representation of the second workflow step, replacing the first representation of the first workflow step with a second representation of the first workflow step and replacing the first representation of the second workflow step with a second representation of the second workflow step, each of the second representations comprising a graphical and user-interactive representation, the second representation of the second workflow step occupying more of the display area than the second representation of the first workflow step.

In one embodiment of the foregoing method, the display area comprises all or a portion of a viewable area of a display of a computing device.

In another embodiment of the foregoing method, the first representation of the first workflow step includes one or more first data entry elements, each of the one or more first data entry elements being operable to receive a corresponding input parameter associated with the first workflow step, the second representation of the first workflow step does not include the one or more first data entry elements, the second representation of the second workflow step includes one or more second data entry elements, each of the one or more second data entry elements being operable to receive a corresponding input parameter associated with the second workflow step, and the first representation of the second workflow step does not include the one or more second data entry elements.

In yet another embodiment of the foregoing method, the first representation of the first workflow step includes a first interactive control element that a user can interact with to change a connection associated with the first workflow step, the second representation of the first workflow step does not include the first interactive control element, the second representation of the second workflow step includes a second interactive control element that a user can interact with to change a connection associated with the second workflow step, and the first representation of the second workflow step does not include the second interactive control element.

In still another embodiment of the foregoing method, the first representation of the first workflow step comprises an expanded representation of the first workflow step, the second representation of the first workflow step comprises a collapsed representation of the first workflow step, the first representation of the second workflow step comprises a collapsed representation of the second workflow step, and the second representation of the second workflow step comprises an expanded representation of the second workflow step.

In further accordance with such an embodiment, the method may further comprise presenting within each of the expanded and collapsed representations of the first workflow step a first interactive control element that a user can interact with to switch between the expanded and collapsed representations of the first workflow step; and presenting within each of the expanded and collapsed representations of the second workflow step a second interactive control element that the user can interact with to switch between the expanded and collapsed representations of the second workflow step.

In a further embodiment of the foregoing method, the first workflow step comprises a workflow step to be performed if a condition is met and the second workflow step comprises a workflow step to be performed if the condition is not met; and the first and second representations of the first and second workflow steps are presented in a side-by-side fashion within the predefined display area.

In further accordance with such an embodiment, the method may further comprise presenting a first data entry element within the workflow designer GUI via which a user can identify an object for which the condition is to be established, presenting a second data entry element within the workflow designer GUI via which the user can specify a relationship, and presenting a third data entry element within the workflow designer GUI via which the user can input a value, wherein the condition is deemed met if the object has the relationship to the value and the condition is not met if the object does not have the relationship to the value.

In still further accordance with such an embodiment, the first representation of the first workflow step and the first representation of the second workflow step may be presented in response to determining that the user has identified the object via the first data entry element, specified the relationship via the second data entry element, and input the value via the third data entry element.

In a still further embodiment of the foregoing method, the method further includes: presenting a first interactive control element within each of the first and second representations of the first workflow step; in response to user interaction with the first interactive control element, enabling the user to selectively edit, rename or delete the first workflow step; presenting a second interactive control element within each of the first and second representations of the second workflow step; and in response to user interaction with the second interactive control element, enabling the user to selectively edit, rename or delete the first workflow step.

A system is also described herein. The system includes at least one processor circuit and at least one memory that stores program code configured to be executed by the at least one processor circuit. The program code comprises a user interface generator configured to: present a workflow designer graphical user interface (GUI) within a display area; present within the workflow designer GUI an expanded graphical representation of a first workflow step of a workflow under development; determine that a user has added a second workflow step to the workflow under development; and in response to at least determining that the user has added the second workflow step to the workflow under development, replace the expanded graphical representation of the first workflow step with a collapsed graphical representation of the first workflow step and simultaneously present with the collapsed graphical representation of the first workflow step an expanded graphical representation of the second workflow step, the expanded graphical representation of the second workflow step occupying more of the display area than the collapsed graphical representation of the first workflow step.

In one embodiment of the foregoing system, the system further includes a display, wherein the display area comprises all or a portion of a viewable area of the display.

In another embodiment of the foregoing system, the expanded graphical representation of the first workflow step includes one or more first data entry elements, each of the one or more first data entry elements being operable to receive a corresponding input parameter associated with the first workflow step, the collapsed graphical representation of the first workflow step does not include the one or more first data entry elements, and the expanded graphical representation of the second workflow step includes one or more second data entry elements, each of the one or more second data entry elements being operable to receive a corresponding input parameter associated with the second workflow step.

In yet another embodiment of the foregoing system, the expanded graphical representation of the first workflow step includes an interactive control element that a user can interact with to change a connection associated with the first workflow step, the collapsed graphical representation of the first workflow step does not include the interactive control element that the user can interact with to change the connection associated with the first workflow step, and the expanded graphical representation of the second workflow step includes an interactive control element that a user can interact with to change a connection associated with the second workflow step.

In still another embodiment of the foregoing system, the user interface generator is further configured to: determine that the user has added a third workflow step to the workflow under development and in response to at least determining that the user has added the third workflow step to the workflow under development, replace the expanded graphical representation of the second workflow step with a collapsed graphical representation of the second workflow step and simultaneously present with the collapsed graphical representation of the first workflow step and the collapsed graphical representation of the second workflow step an expanded graphical representation of the third workflow step, the expanded graphical representation of the third workflow step occupying more of the display area than either of the collapsed graphical representation of the first workflow step and the collapsed graphical representation of the second workflow step.

In further accordance with such an embodiment, the user interface generator may be further configured to: present within each of the expanded and collapsed graphical representations of the first workflow step a first interactive control element that a user can interact with to switch between the expanded and collapsed graphical representations of the first workflow step; and present within each of the expanded and collapsed graphical representations of the second workflow step a second interactive control element that the user can interact with to switch between the expanded and collapsed graphical representations of the second workflow step.

In still further accordance with such an embodiment, the user interface generator may be further configured to: present a first interactive control element within each of the expanded and collapsed graphical representations of the first workflow step; in response to user interaction with the first interactive control element, enable the user to selectively edit, rename or delete the first workflow step; present a second interactive control element within each of the expanded and collapsed graphical representations of the second workflow step; and in response to user interaction with the second interactive control element, enable the user to selectively edit, rename or delete the second workflow step.

A computer program product is described herein. The computer program product comprises a computer-readable memory having computer program logic recorded thereon that when executed by at least one processor causes the at least one processor to perform a method. The method comprises: receiving an indication that a user has interacted with a first representation of a first workflow step of a workflow under development, the first representation of the first workflow step being presented within a display area of a workflow designer graphical user interface (GUI) concurrently and in a side-by-side manner with a first representation of a second workflow step of the workflow under development t, each of the first representations comprising a graphical and user-interactive representation, the first representation of the first workflow step occupying less of the display area than the first representation of the second workflow step, the first workflow step comprising a workflow step to be performed if a condition is not met and the second workflow step comprising a workflow step to be performed if the condition is met; in response to at least receiving the indication that the user has interacted with the first representation of the second workflow step; and in response to at least determining that the user has interacted with the first representation of the first workflow step, replacing the first representation of the first workflow step with a second representation of the first workflow step and replacing the first representation of the second workflow step with a second representation of the second workflow step, each of the second representations comprising a graphical and user-interactive representation, the second representation of the first workflow step occupying more of the display area than the second representation of the second workflow step.

In one embodiment of the foregoing computer program product, the method further comprises: receiving an identification of an object for which the condition is to be established via a first data entry element within the workflow designer GUI; receiving a specification of a relationship via a second data entry element within the workflow designer GUI; and receiving a value via a third data entry element within the workflow designer GUI; wherein the condition is deemed met if the object has the relationship to the value and the condition is not met if the object does not have the relationship to the value.

In another embodiment of the foregoing computer program product, the method further includes: causing the first representation of the first workflow step and the first representation of the second workflow step to be presented in response to receiving the identification of the object via the first data entry element, receiving the specification of the relationship via the second data entry element, and receiving the value via the third data entry element.

VI. Conclusion

While various embodiments have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
    presenting a workflow designer graphical user interface (GUI) within a display area;
    presenting within the workflow designer GUI an expanded graphical representation of a first workflow step of a workflow under development;
    determining that a user has added a second workflow step to the workflow under development; and
    in response to at least determining that the user has added the second workflow step to the workflow under development, replacing the expanded graphical representation of the first workflow step with a collapsed graphical representation of the first workflow step and simultaneously presenting with the collapsed graphical representation of the first workflow step an expanded graphical representation of the second workflow step, the expanded graphical representation of the second workflow step occupying more of the display area than the collapsed graphical representation of the first workflow step.

2. The method of claim 1, wherein the display area comprises all or a portion of a viewable area of a display of a computing device.

3. The method of claim 1, wherein:
the expanded graphical representation of the first workflow step includes one or more first data entry elements, each of the one or more first data entry elements being operable to receive a corresponding input parameter associated with the first workflow step;
the collapsed graphical representation of the first workflow step does not include the one or more first data entry elements; and
the expanded graphical representation of the second workflow step includes one or more second data entry elements, each of the one or more second data entry elements being operable to receive a corresponding input parameter associated with the second workflow step.

4. The method of claim 1, wherein:
the expanded graphical representation of the first workflow step includes an interactive control element that a user can interact with to change a connection associated with the first workflow step;
the collapsed graphical representation of the first workflow step does not include the interactive control element that the user can interact with to change the connection associated with the first workflow step; and
the expanded graphical representation of the second workflow step includes an interactive control element that a user can interact with to change a connection associated with the second workflow step.

5. The method of claim 1, further comprising:
determining that the user has added a third workflow step to the workflow under development; and
in response to at least determining that the user has added the third workflow step to the workflow under development, replacing the expanded graphical representation of the second workflow step with a collapsed graphical representation of the second workflow step and simultaneously presenting with the collapsed graphical representation of the first workflow step and the collapsed graphical representation of the second workflow step an expanded graphical representation of the third workflow step, the expanded graphical representation of the third workflow step occupying more of the display area than either of the collapsed graphical representation of the first workflow step and the collapsed graphical representation of the second workflow step.

6. The method of claim 5, further comprising:
presenting within each of the expanded and collapsed graphical representations of the first workflow step a first interactive control element that a user can interact with to switch between the expanded and collapsed graphical representations of the first workflow step; and
presenting within each of the expanded and collapsed graphical representations of the second workflow step a second interactive control element that the user can interact with to switch between the expanded and collapsed graphical representations of the second workflow step.

7. The method of claim 5, further comprising:
presenting a first interactive control element within each of the expanded and collapsed graphical representations of the first workflow step;
in response to user interaction with the first interactive control element, enabling the user to selectively edit, rename or delete the first workflow step;
presenting a second interactive control element within each of the expanded and collapsed graphical representations of the second workflow step; and
in response to user interaction with the second interactive control element, enabling the user to selectively edit, rename or delete the second workflow step.

8. A system, comprising:
at least one processor circuit; and
at least one memory that stores program code configured to be executed by the at least one processor circuit, the program code comprising a user interface generator configured to:
present a workflow designer graphical user interface (GUI) within a display area;
present within the workflow designer GUI an expanded graphical representation of a first workflow step of a workflow under development;
determine that a user has added a second workflow step to the workflow under development; and
in response to at least determining that the user has added the second workflow step to the workflow under development, replace the expanded graphical representation of the first workflow step with a collapsed graphical representation of the first workflow step and simultaneously present with the collapsed graphical representation of the first workflow step an expanded graphical representation of the second workflow step, the expanded graphical representation of the second workflow step occupying more of the display area than the collapsed graphical representation of the first workflow step.

9. The system of claim 8, further comprising:
a display;
wherein the display area comprises all or a portion of a viewable area of the display.

10. The system of claim 8, wherein:
the expanded graphical representation of the first workflow step includes one or more first data entry elements, each of the one or more first data entry elements being operable to receive a corresponding input parameter associated with the first workflow step;
the collapsed graphical representation of the first workflow step does not include the one or more first data entry elements; and
the expanded graphical representation of the second workflow step includes one or more second data entry elements, each of the one or more second data entry elements being operable to receive a corresponding input parameter associated with the second workflow step.

11. The system of claim 8, wherein:
the expanded graphical representation of the first workflow step includes an interactive control element that a user can interact with to change a connection associated with the first workflow step;
the collapsed graphical representation of the first workflow step does not include the interactive control element that the user can interact with to change the connection associated with the first workflow step; and
the expanded graphical representation of the second workflow step includes an interactive control element that a user can interact with to change a connection associated with the second workflow step.

12. The system of claim 8, wherein the user interface generator is further configured to:
- determine that the user has added a third workflow step to the workflow under development; and
- in response to at least determining that the user has added the third workflow step to the workflow under development, replace the expanded graphical representation of the second workflow step with a collapsed graphical representation of the second workflow step and simultaneously present with the collapsed graphical representation of the first workflow step and the collapsed graphical representation of the second workflow step an expanded graphical representation of the third workflow step, the expanded graphical representation of the third workflow step occupying more of the display area than either of the collapsed graphical representation of the first workflow step and the collapsed graphical representation of the second workflow step.

13. The system of claim 12, wherein the user interface generator is further configured to:
- present within each of the expanded and collapsed graphical representations of the first workflow step a first interactive control element that a user can interact with to switch between the expanded and collapsed graphical representations of the first workflow step; and
- present within each of the expanded and collapsed graphical representations of the second workflow step a second interactive control element that the user can interact with to switch between the expanded and collapsed graphical representations of the second workflow step.

14. The system of claim 12, wherein the user interface generator is further configured to:
- present a first interactive control element within each of the expanded and collapsed graphical representations of the first workflow step;
- in response to user interaction with the first interactive control element, enable the user to selectively edit, rename or delete the first workflow step;
- present a second interactive control element within each of the expanded and collapsed graphical representations of the second workflow step; and
- in response to user interaction with the second interactive control element, enable the user to selectively edit, rename or delete the second workflow step.

15. A computer program product comprising a computer-readable memory having computer program logic recorded thereon that when executed by at least one processor causes the at least one processor to perform a method, the method comprising:
- presenting a workflow designer graphical user interface (GUI) within a display area;
- presenting within the workflow designer GUI an expanded graphical representation of a first workflow step of a workflow under development;
- determining that a user has added a second workflow step to the workflow under development; and
- in response to at least determining that the user has added the second workflow step to the workflow under development, replacing the expanded graphical representation of the first workflow step with a collapsed graphical representation of the first workflow step and simultaneously presenting with the collapsed graphical representation of the first workflow step an expanded graphical representation of the second workflow step, the expanded graphical representation of the second workflow step occupying more of the display area than the collapsed graphical representation of the first workflow step.

16. The computer program product of claim 15, wherein the display area comprises all or a portion of a viewable area of a display of a computing device.

17. The computer program product of claim 15, wherein:
- the expanded graphical representation of the first workflow step includes one or more first data entry elements, each of the one or more first data entry elements being operable to receive a corresponding input parameter associated with the first workflow step;
- the collapsed graphical representation of the first workflow step does not include the one or more first data entry elements; and
- the expanded graphical representation of the second workflow step includes one or more second data entry elements, each of the one or more second data entry elements being operable to receive a corresponding input parameter associated with the second workflow step.

18. The computer program product of claim 15, wherein:
- the expanded graphical representation of the first workflow step includes an interactive control element that a user can interact with to change a connection associated with the first workflow step;
- the collapsed graphical representation of the first workflow step does not include the interactive control element that the user can interact with to change the connection associated with the first workflow step; and
- the expanded graphical representation of the second workflow step includes an interactive control element that a user can interact with to change a connection associated with the second workflow step.

19. The computer program product of claim 15, wherein the method further comprises:
- determining that the user has added a third workflow step to the workflow under development; and
- in response to at least determining that the user has added the third workflow step to the workflow under development, replacing the expanded graphical representation of the second workflow step with a collapsed graphical representation of the second workflow step and simultaneously presenting with the collapsed graphical representation of the first workflow step and the collapsed graphical representation of the second workflow step an expanded graphical representation of the third workflow step, the expanded graphical representation of the third workflow step occupying more of the display area than either of the collapsed graphical representation of the first workflow step and the collapsed graphical representation of the second workflow step.

20. The computer program product of claim 19, wherein the method further comprises:
- presenting within each of the expanded and collapsed graphical representations of the first workflow step a first interactive control element that a user can interact with to switch between the expanded and collapsed graphical representations of the first workflow step; and
- presenting within each of the expanded and collapsed graphical representations of the second workflow step a second interactive control element that the user can interact with to switch between the expanded and collapsed graphical representations of the second workflow step.

* * * * *